United States Patent
Waibel et al.

(10) Patent No.: US 9,753,918 B2
(45) Date of Patent: Sep. 5, 2017

(54) LEXICON DEVELOPMENT VIA SHARED TRANSLATION DATABASE

(71) Applicant: Facebook, Inc., Menlo Park, CA (US)

(72) Inventors: Alexander Waibel, Murrysville, PA (US); Ian R. Lane, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 14/589,540

(22) Filed: Jan. 5, 2015

(65) Prior Publication Data

US 2015/0127321 A1    May 7, 2015

Related U.S. Application Data

(63) Continuation of application No. 13/008,346, filed on Jan. 18, 2011, now Pat. No. 8,972,268, which is a
(Continued)

(51) Int. Cl.
*G10L 21/00* (2013.01)
*G06F 17/28* (2006.01)
(Continued)

(52) U.S. Cl.
CPC ........ *G06F 17/289* (2013.01); *G06F 17/2818* (2013.01); *G10L 13/00* (2013.01);
(Continued)

(58) Field of Classification Search
CPC ................................ G06F 17/289; G10L 15/26
(Continued)

(56) References Cited

U.S. PATENT DOCUMENTS

| 6,067,514 A | 5/2000 | Chen |
| 6,148,105 A | 11/2000 | Wakisaka et al. |

(Continued)

FOREIGN PATENT DOCUMENTS

| JP | H03-282776 A | 12/1991 |
| JP | H04-319769 A | 11/1992 |

(Continued)

OTHER PUBLICATIONS

Benus, S. et al., "The Prosody of BackChannels in American English," *ICPhS XVI*, Aug. 6-10, 2007, pp. 1065-1068.
(Continued)

*Primary Examiner* — Shaun Roberts
(74) *Attorney, Agent, or Firm* — Fenwick & West LLP

(57) ABSTRACT

A speech translation system and methods for cross-lingual communication that enable users to improve and customize content and usage of the system and easily. The methods include, in response to receiving an utterance including a first term associated with a field, translating the utterance into a second language. In response to receiving an indication to add the first term associated with the field to a first recognition lexicon, adding the first term associated with the field and the determined translation to a first machine translation module and to a shared database for a community associated with the field of the first term associated with the field, wherein the first term associated with the field added to the shared database is accessible by the community.

22 Claims, 18 Drawing Sheets

Related U.S. Application Data continuation of application No. 12/689,042, filed on Jan. 18, 2010, now Pat. No. 9,070,363, which is a continuation of application No. 12/424,311, filed on Apr. 15, 2009, now Pat. No. 8,204,739.

(60) Provisional application No. 61/045,079, filed on Apr. 15, 2008, provisional application No. 61/092,581, filed on Aug. 28, 2008, provisional application No. 61/093,898, filed on Sep. 3, 2008.

(51) Int. Cl.
*G10L 13/00* (2006.01)
*G10L 13/04* (2013.01)
*G10L 15/06* (2013.01)
*G10L 15/22* (2006.01)
*G10L 15/26* (2006.01)

(52) U.S. Cl.
CPC ............ *G10L 13/043* (2013.01); *G10L 15/06* (2013.01); *G10L 15/22* (2013.01); *G10L 15/26* (2013.01); *G10L 15/265* (2013.01); *G10L 15/063* (2013.01); *G10L 2015/0631* (2013.01)

(58) Field of Classification Search
USPC ........................................................ 704/277
See application file for complete search history.

(56) References Cited

U.S. PATENT DOCUMENTS

| | | | |
|---|---|---|---|
| 6,266,642 B1 | 7/2001 | Franz et al. | |
| 6,356,865 B1 | 3/2002 | Franz et al. | |
| 6,697,777 B1 | 2/2004 | Ho et al. | |
| 6,721,697 B1 | 4/2004 | Duan et al. | |
| 6,826,582 B1 | 11/2004 | Chatterjee et al. | |
| 6,941,269 B1 | 9/2005 | Cohen et al. | |
| 6,983,248 B1* | 1/2006 | Tahara | G10L 15/187 704/255 |
| 7,539,619 B1 | 5/2009 | Seligman et al. | |
| 7,552,053 B2 | 6/2009 | Gao et al. | |
| 7,668,718 B2 | 2/2010 | Kahn et al. | |
| 7,921,018 B2* | 4/2011 | Hong | G06F 17/289 704/10 |
| 8,090,570 B2 | 1/2012 | Waibel | |
| 8,504,351 B2 | 8/2013 | Waibel et al. | |
| 8,515,728 B2 | 8/2013 | Boyd et al. | |
| 9,070,363 B2 | 6/2015 | Waibel et al. | |
| 9,128,926 B2 | 9/2015 | Waibel | |
| 9,524,295 B2 | 12/2016 | Waibel | |
| 2001/0029455 A1* | 10/2001 | Chin | G06F 17/273 704/277 |
| 2001/0044726 A1* | 11/2001 | Li | H04N 5/44543 704/277 |
| 2002/0095292 A1 | 7/2002 | Mittal et al. | |
| 2002/0169592 A1 | 11/2002 | Aityan | |
| 2003/0009320 A1* | 1/2003 | Furuta | G06F 17/2836 704/2 |
| 2003/0115059 A1 | 6/2003 | Jayaratne | |
| 2004/0167771 A1 | 8/2004 | Duan et al. | |
| 2005/0119899 A1 | 6/2005 | Palmquist | |
| 2005/0228641 A1 | 10/2005 | Chelba et al. | |
| 2005/0288922 A1 | 12/2005 | Kooiman | |
| 2006/0136193 A1* | 6/2006 | Lux-Pogodalla | G06F 17/2247 704/2 |
| 2006/0293896 A1 | 12/2006 | Nakagawa | |
| 2007/0032225 A1 | 2/2007 | Konicek et al. | |
| 2007/0043567 A1 | 2/2007 | Gao et al. | |
| 2007/0071206 A1 | 3/2007 | Gainsboro et al. | |
| 2007/0124131 A1 | 5/2007 | Chino et al. | |
| 2007/0133437 A1 | 6/2007 | Wengrovitz et al. | |
| 2007/0136068 A1 | 6/2007 | Horvitz | |
| 2007/0249406 A1 | 10/2007 | Andreasson | |
| 2008/0103907 A1 | 5/2008 | Maislos et al. | |
| 2008/0240379 A1 | 10/2008 | Maislos et al. | |
| 2009/0076792 A1 | 3/2009 | Lawson-Tancred | |
| 2009/0274299 A1 | 11/2009 | Caskey et al. | |
| 2010/0023472 A1 | 1/2010 | Loeb | |
| 2010/0082326 A1 | 4/2010 | Bangalore et al. | |
| 2010/0251137 A1 | 9/2010 | Qureshi | |
| 2010/0280828 A1 | 11/2010 | Fein et al. | |

FOREIGN PATENT DOCUMENTS

| | | |
|---|---|---|
| JP | H05-189481 A | 7/1993 |
| JP | H05-197744 A | 8/1993 |
| JP | H07-129594 A | 5/1995 |
| JP | H08-329088 A | 12/1996 |
| JP | H09-134192 A | 5/1997 |
| JP | H10-97286 A | 4/1998 |
| JP | H11-352994 A | 12/1999 |
| JP | 2000-305930 A | 11/2000 |
| JP | 2001-325254 A | 11/2001 |
| JP | 2002-91963 A | 3/2002 |
| JP | 2002-183136 A | 6/2002 |
| JP | 2002-207495 A | 7/2002 |
| JP | 2003-288339 A | 10/2003 |
| JP | 2004-310256 A | 11/2004 |
| JP | 2005-122094 A | 3/2005 |
| JP | 2006-201873 A | 8/2006 |
| JP | 2006-318202 A | 11/2006 |
| WO | WO 02/31814 A1 | 4/2002 |
| WO | WO 2009/129315 A1 | 10/2009 |

OTHER PUBLICATIONS

Bertrand, R. et al., "Backchannels revisited from a multimodal perspective," *Proceedings of Auditory-visual Speech Processing*, 2007, five pages, Hilvarenbeek, Netherlands.

Cathcart, N. et al., "A Shallow Model of Backchannel Continuers in Spoken Dialogue," *Proceedings of the Tenth Conference on European Chapter of the Association for Computational Linguistics*, 2003, pp. 51-58, vol. 1, Association for Computational Linguistics.

European Patent Office, European Search Report and Opinion, European Patent Application No. 14190061.3, Jul. 2, 2015, ten pages.

European Patent Office, Examination Report, European Patent Application No. 11702324.2, Sep. 28, 2015, four pages.

European Patent Office, Partial European Search Report, European Patent Application No. 14190061.3, Mar. 2, 2105, six pages.

European Patent Office, Summons to attend oral proceedings pursuant to Rule 115(1) EPC, European Patent Application No. 09732921.3, Mar. 17, 2015, five pages.

Fujie, S., et al., "A Conversation Robot with Back-channel Feedback Function based on Linguistic and Nonlinguistic Information," *Second International Conference on Autonomous Robots and Agents*, Dec. 13-15, 2004, pp. 379-384, Palmerston North, New Zealand.

Japan Patent Office, Office Action, Japanese Patent Application No. 2011-505169, Jul. 7, 2015, twenty-three pages.

Lane, I.R. et al., "Class-based Statistical Machine Translation for Field Maintainable Speech-To-Speech Translation," *Interspeech 2008*, Sep. 26, 2008, pp. 2362-2365, XP002535596.

Noguchi, H. et al., "Prosody-based detection of the context of backchannel responses," *ICSLP*, 1998, four pages.

Okumura, A. et al., "An Automatic Speech Translation System for Travel Conversation," *Second International Conference on Human Language Technology Research*, 2002, pp. 411-412, vol. 43, No. 1.

Schaaf, T., "Detection of OOV Words Using Generalized Word Models and a Semantic Class Language Model," in *Proceedings of Eurospeech*, 2001, four pages.

Shriberg, E. et al., "Prosody-Based Automatic Segmentation of Speech into Sentences and Topics," *Speech Communication*, 2000, pp. 127-154.

Stolcke, A., "Modeling Linguistic Segment and Turn Boundaries for N-Best Rescoring of Spontaneous Speech," In *Proceedings of Eurospeech*, 1997, vol. 5, four pages.

(56) References Cited

OTHER PUBLICATIONS

Stolke, A. et al., "Automatic Linguistic Segmentation of Conversational Speech," *Fourth International Conference on Spoken Language, ICSLP '96*, Oct. 3, 1996-Oct. 6, 1996, pp. 1005-1008, vol. 2, Philadelphia, U.S.A.
Stolke, A. et al., "Dialogue Act Modeling for Automatic Tagging and Recognition of Conversational Speech," *Computational Linguistics*, 2000, pp. 339-373, vol. 26, No. 3.
United States Office Action, U.S. Appl. No. 12/689,042, Oct. 28, 2014, fifteen pages.
United States Office Action, U.S. Appl. No. 13/675,775, Nov. 21, 2014, sixteen pages.
United States Office Action, U.S. Appl. No. 14/797,045, Sep. 18, 2015, twenty-nine pages.
Waibel, A. et al., "Spoken Language Translation," *IEEE Signal Processing Magazine*, May 2008, pp. 70-79, vol. 25, No. 3.
Ward, N. "Using Prosodic Clues to Decide When to Produce Back-channel Utterances," *Proceedings of the Fourth International Conference on Spoken Language, ICSLP 96*, Oct. 3-6, 1996, pp. 1728-1731, vol. 3, Philadelphia, PA, USA.
Ward, N. et al., "Prosodic features which cue back-channel responses in English and Japanese," *Journal of Pragmatics*, 2000, pp. 1177-1207, vol. 32.
European Patent Office, Examination Report, European Patent Application No. 14190061.3, Aug. 12, 2016, seven pages.
European Patent Office, Summons to attend oral proceedings pursuant to Rule 115(1) EPC, Aug. 4, 2016, seven pages.
Fugen, C. et al., "Open Domain Speech Translation: From Seminars and Speeches to Lectures," *TC-STAR Workshop on Speech-to-Speech Translation*, Jun. 19-21, 2006, pp. 81-86, Barcelona, Spain.
Hurst, W., "Indexing, Searching, and Skimming of Multimedia Documents Containing Recorded Lectures and Live Presentations," *Proceedings of ACM Multimedia*, Nov. 2-8, 2003, two pages, Berkeley, USA.
Kashioka, H., "Translation Unit Concerning Timing of Simultaneous Translation," *Proceedings of the Third International Conference on Language Resources and Evaluation*, May 27-Jun. 2, 2002, pp. 142-146, Las Palmas de Gran Canaria, Spain.
Kohler, T.W. et al., "Rapid Porting of ASR-Systems to Mobile Devices," *Proceedings of the 9th European Conference on Speech Communication and Technology*, Sep. 2005, pp. 233-236, Lisbon, Portugal.
Leggetter, C.J. et al., "Maximum likelihood linear regression for speaker adaptation of continuous density hidden Markov models," *Proceedings of Computer Speech and Language*, 1995, pp. 171-185, vol. 9.
Matusov, E. et al., "Evaluating Machine Translation Output with Automatic Sentence Segmentation," *Proceedings of IWSLT*, 2005, pp. 148-154, Pittsburgh, USA.
Nanjo, H. et al., "Language Model and Speaking Rate Adaptation for Spontaneous Presentation Speech Recognition," *IEEE Transactions on Speech and Audio Processing*, Jul. 2004, pp. 391-400, vol. 12.
Paulik, M. et al., "Document Driven Machine Translation Enhanced ASR," *Proceedings of European Conference on Speech Communication and Technology, Interspeech*, Sep. 2005, four pages.
United States Office Action, U.S. Appl. No. 14/722,013, Oct. 3, 2016, thirteen pages.
Vogel, S. et al., "The ISL Statistical Translation System for Spoken Language Translation," *Proceedings of the International Workshop on Spoken Language Translation*, 2004, pp. 65-72, Kyoto, Japan.
United States Office Action, U.S. Appl. No. 14/522,164, Mar. 9, 2016, twelve pages.
Hamaker, J. et al., "Resegmentation and Transcription of Switchboard," *in Proceedings of LVCSR Workshop*, Sep. 1998, four pages, Maritime Institute of Technology, Linthicum Heights, Maryland, United States.
Japan Patent Office, Office Action, Japanese Patent Application No. 2015-218066, Feb. 28, 2017, eight pages.

\* cited by examiner

LEXICON DEVELOPMENT VIA SHARED TRANSLATION DATABASE

CROSS REFERENCE TO RELATED APPLICATIONS

This application is a continuation of co-pending U.S. application Ser. No. 13/008,346, filed on Jan. 18, 2011, allowed, which is a continuation in part of co-pending U.S. patent application Ser. No. 12/689,042 filed on Jan. 18, 2010; which is a continuation in part of U.S. patent application Ser. No. 12/424,311 filed on Apr. 15, 2009, now U.S. Pat. No. 8,204,739, issued Jun. 19, 2012, which claims the benefit of U.S. Provisional Patent Application No. 61/045,079 filed on Apr. 15, 2008, U.S. Provisional Patent Application No. 61/092,581 filed on Aug. 28, 2008, and U.S. Provisional Patent Application No. 61/093,898 filed on Sep. 3, 2008, the contents of which are incorporated herein by reference in their entirety.

BACKGROUND

Field of the Invention

The present invention is directed generally to speech-to-speech translation systems for cross-lingual communication and, more particularly, to a method and system for field maintenance that enables users to add new vocabulary items and to improve and modify the content and usage of their system in the field, without requiring linguistic or technical knowledge or expertise. In various examples, the systems and methods disclosed also enable non-expert users to improve and modify the coverage and usage of their system in the field and to maximize the usefulness for effective communication without requiring linguistic or technical knowledge or expertise and provide a novel.

Description of the Invention Background

Automatic speech recognition (ASR) and machine translation (MT) technologies have matured to the point where it has become feasible to develop practical speech translation systems on laptops or mobile devices for limited and unlimited domains. Domain limited speech-to-speech systems, in particular, have been developed in the research field and in research laboratories for a variety of application domains, including tourism, medical deployment and for military applications. Such systems have been seen before in the works of A. Waibel, C. Fugen, "Spoken language translation" in Signal Processing Magazine, IEEE May 2008; 25(3):70-79; and Nguyen Bach, Matthias Eck, Paisarn Charoenpornsawat, Thilo Köhler, Sebastian Stoker, ThuyLinh Nguyen, Roger Hsiao, Alex Waibel, Stephan Vogel, Tanja Schultz and Alan W. Black, for examples. "The CMU TransTac 2007 eyes-free and hands-free two-way speech-to-speech translation system," In Proc. of the IWSLT, Trento, Italy, October 2007. They are limited, however, in that they operate with a limited vocabulary which is defined by the developers of the system in advance, and is determined by the application domain, and the location where it is envisioned the system will be used. Thus vocabularies and language usage are determined largely based on example scenarios and by data that is collected or presumed in such scenarios.

In field situations, however, actual words and language usage deviate from the anticipated scenario of the laboratory. Even in simple domains such as tourism language usage will vary dramatically in the field as a user travels to different locations, interacts with different people and pursues different goals and needs. Thus, new words and new expressions will always arise. Such new words—in speech recognition parlance "out-of-vocabulary" (OOV) words will be misrecognized as an in-vocabulary word and then translated incorrectly. The user may attempt a paraphrase, but if a critical word or concept (such as a person or a city name) cannot be entered or communicated, the absence of the word or expression may lead to communication break-down.

Despite the need for user modifiable speech-to-speech translation systems, an actual solution has so far not been proposed. While adding a word to the system may seem to be easy, making such modifications proves to be extraordinarily difficult. Appropriate modifications must be made to many component modules throughout the entire system, and most modules would have to be retrained to restore the balance and integrated functioning of the components. Indeed, about 20 different modules would have to be modified or re-optimized to learn a new word. Such modifications require expertise and experience with the components of a speech translation system, and as a result, to the inventor's understanding, such modifications have so far been done only in the laboratory by experts, requiring human expertise, time and cost.

For example, if a system designed for users in Europe does not contain the name "Hong Kong" in the vocabulary. Once a speaker speaks the sentence "Let's go to Hong Kong", the system will recognize the closest sounding similar word in the dictionary and produce: "Let's go to home call". At this point it is not obvious if the error was the result of a recognition error or result of the absence of this word in the entire speech-to-speech translation system. The user therefore proceeds to correct the system. This can be done by one of several correction techniques. The simplest might be re-speaking or typing, but it can alternatively be done more effectively by cross-modal error correction techniques as described by other disclosures and prior art (Waibel, et al., U.S. Pat. No. 5,855,000). Once the correct spelling of the desired word sequence has been established ("Let's go to Hong Kong"), the system performs a translation. If "Hong Kong" is in the dictionary, the system would proceed from there normally, performing translation and synthesis. If, however, it is absent from the recognition and translation dictionary, the system would need to establish if this word is a named entity or not. Finally, and most importantly, even if a name or word can be translated properly to the output languages by user intervention, without learning it, the system would fail again when the user speaks the same word the next time around.

Unfortunately, learning a new word cannot be addressed just by simply typing in a new word in a word list, but it requires changes at about 20 different points and at all levels of a speech translation system. Presently it also involves manual tagging and editing of entries, collection of extensive databases involving the required word, retraining of language model and translation model probabilities and re-optimization of the entire system, so as to re-establish the consistency between all the components and components' dictionaries and to restore the statistical balance between the words, phrases and concepts in the system (probabilities have to add up to 1, and thus all words would be affected by a single word addition).

As a result, even small modifications of existing speech translation systems have generally required use of advanced computing tools and linguistic resources found in research labs. For actual field use, however, it is unacceptable to require every modification to be done at the lab, since it takes too much time, effort and cost. Instead, a learning and customization module is needed that hides all the complexity from the user, and performs all the critical operations and language processing steps semi-autonomously or autonomously behind the scenes, and interacts with the human user in the least disruptive manner possible by way of a simple intuitive interface, thereby eliminating the need for linguistic or technical expertise in the field altogether. In the present invention, we provide a detailed description for a learning and customization module that satisfies these needs.

Speech translation systems have achieved a level of performance that now makes effective speech translation in broad popular use a reality, and permits its use on small portable platforms such as laptop computers, PDA's and mobile telephones. As such, it is impractical to send speech translation systems back to the developer every time errors occur, vocabulary items are missing. Similarly, field situations dictate, that a user must be able to deal with errors quickly and effectively, and that effective communication is supported through the device, however, imperfect its performance. Error handling becomes a critical part of delivering fast and effective speech communication. Errors are problematic only, if they cannot be aborted quickly, corrected quickly and system performance improve (learn) from the correction. Thus, there is a need for systems and methods that use machine translation techniques to provide techniques to efficiently deal with errors during translation. There are also needs to provide users of such systems and methods with more robust capabilities to facilitate translation and enable the user to take advantage of its customized system such as through the creation of one or more added modules including favorites lists, language learning tools and notification of third party information based upon usage of the system and methods.

SUMMARY OF THE INVENTION

In various embodiments, the present invention solves the foregoing problems by providing a system and methods for updating the vocabulary of a speech translation system. A computer assisted method is provided for overriding the recognition or translation of an utterance input in a speech translation system for translating a first language into a second language. The methods include, in response to receiving an utterance including a first term associated with a field, translating the utterance into a second language. In response to receiving an indication to add the first term associated with the field to a first recognition lexicon, adding the first term associated with the field and the determined translation to a first machine translation module and to a shared database for a community associated with the field of the first term associated with the field, wherein the first term associated with a field added to the shared database is accessible by the community.

Those and other details, objects and advantages of the present invention will become better understood or apparent from the following description and drawings showing embodiments thereof.

BRIEF DESCRIPTION OF DRAWINGS

The accompanying drawings illustrate examples of embodiments of the present invention. In such drawings.

DETAILED DESCRIPTION

Various embodiments of the present invention describe methods and systems for speech-to-speech translation. Embodiments may be used to adapt to the user's voice and speaking style via model adaptation. In further embodiments, the user can correct recognition errors and the system can explicitly learn from errors that the user corrected, thereby making it less likely that these errors occur again in the future. The present invention enables the user to customize the vocabulary to his or her individual needs and environment by either adding new words to the system, or selecting predefined dictionaries that are optimized for a specific location or task. When adding new words a multimodal interface allows the user to correct and verify automatically generated translations and pronunciations. This allows the user to add new words to the system when the user has no knowledge of the other language. In an embodiment, the system is further configured to transmit any new vocabulary inputted by a user to a community of users. This data is collated and dictionaries are automatically generated which can then be downloaded by any user.

Figure 1:
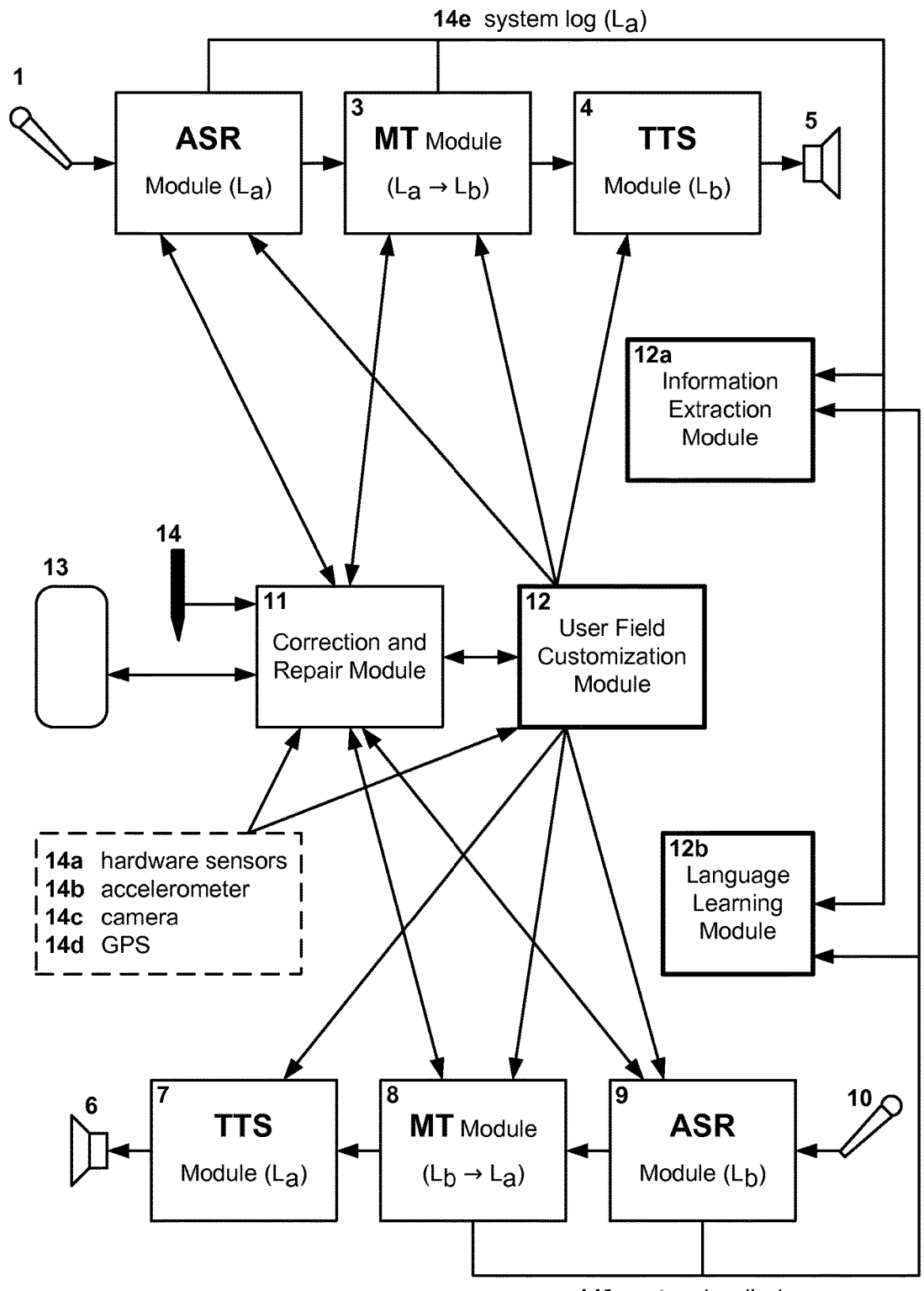
FIG. 1 is a block diagram illustrating a speech-to-speech translation system constructed according to an embodiment of the present invention.

FIG. 1 illustrates a block diagram overview of an example of a field maintainable speech-to-speech translation system according to the present invention. In this example the system operates between two languages $L_a$ and $L_b$. This is the typical implementation of a speech-to-speech dialog system involving speech-to-speech translation in both directions, from $L_a$ and $L_b$ and from $L_b$ and $L_a$. However, the bi-directionality of this configuration is not a prerequisite for the present disclosure. A uni-directional system from $L_a$ and $L_b$, or a multi-directional system involving several languages $L_1$ and $L_n$ could equally benefit from the present invention. The system has two ASR modules 2 and 9, that recognize speech for $L_a$ and $L_b$, respectively, and produce text corresponding to $L_a$ and $L_b$, respectively using acoustic model 18, ASR class-based language model 19 and a recognition lexicon model 20 (shown in FIG. 3), and are means for receiving and recognizing such utterances. In this example, we used the "Ninja" speech recognizer system developed at Mobile Technologies, LLC. Other types of ASR modules which may be used include speech recognizers developed by IBM Corporation, SRI, BBN or at Cambridge or Aachen.

The system also includes two machine translation modules 3 and 8, which translate text from $L_a$ and $L_b$ and from $L_b$ and $L_a$, respectively (module 11). The MT module used in this example was the "PanDoRA" system developed at Mobile Technologies, LLC. Other MT modules could be used such as those developed by IBM Corporation, SRI, BBN or at Aachen University.

Two text-to-speech engines, 4 and 7 each corresponding to one of the machine translation modules 3 and 8, are configured to receive text produced from a corresponding ASR unit. The output text is transferred to the respective MT module, 3 or 8, that translate text from $L_a$ and $L_b$ and from $L_b$ to $L_a$, respectively. The TTS module generates audio output to convert at least one text word in $L_a$ to speech via an output device 5, such as a loud speaker, and at least one text word in $L_b$ to speech via device 5 or another output device, such as a loud speaker 6, respectively. For this example a Cepstral US module was used. Any TTS modules which support Windows SAPI (speech application programming interface) conventions could also be employed.

A correction and repair module 11 allows the user to correct the system output via multiple modalities; including speech, gesture, writing, tactile, touch-sensitive and keyboard interfaces, and enables the system to learn from the user's corrections. The correction and repair module may be of the type such as that disclosed in U.S. Pat. No. 5,855,000. A user field customization module 12, provides an interface for users to add new vocabulary to the system, and can also select an appropriate system vocabulary for their current situation. For example, triggered by a change in location, as determined by the GPS coordinates indicating the current location of the device, or an explicit selection of task or location by the user.

Figure 2:
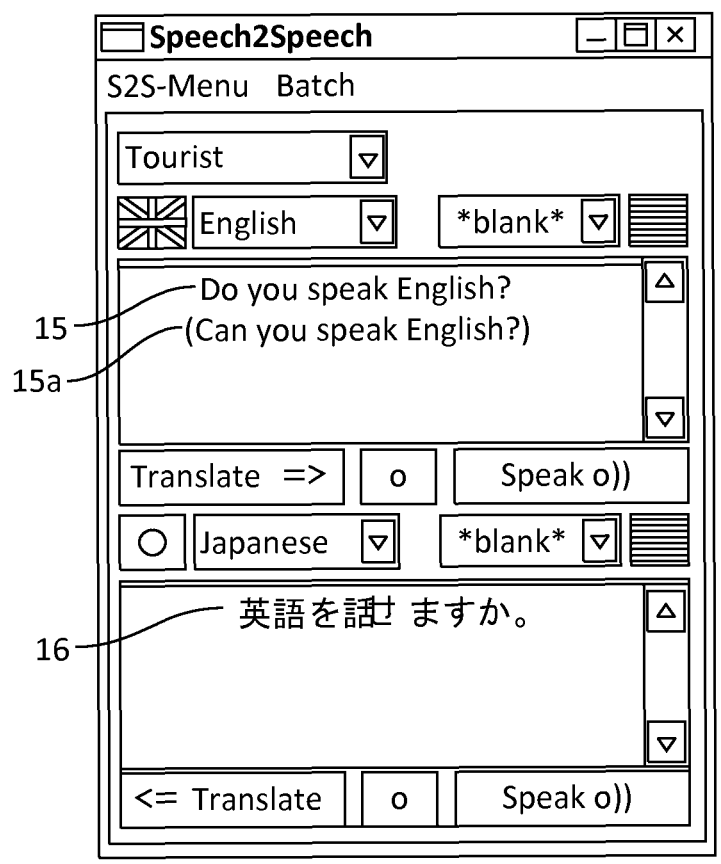
FIG. 2 illustrates an example of a graphical user interface that is displayed to user via a tablet interface.

The user can access the user field customization module 12 and interact with the system via a graphical user interface displayed on the screen (or active touch screen) of the device 13, and a pointing device 14, including a mouse or pen. An example of a graphical user interface is shown in FIG. 2. In this example, the device 13 displays the text of audio input of a $L_a$ and corresponding text in window 15. Machine translation of text $L_a$ in the second language $L_b$ is displayed in window 16.

In an embodiment, the same microphone and loudspeaker can be used for both languages. Thus, microphones 1 and 10 can be a single physical device, and speakers 5 and 6 can be a single physical device.

In an embodiment, an information extraction module, 12a, will be present which extracts information from recent system logs 14e (for language La) and 14f (for language Lb), and presents targeted advertisement and supportive information via a graphical user interface displayed on the screen of the device 13. Relevant information will be obtained from the internet or a local knowledgebase.

In an embodiment, a language learning module, 12b, will be present which extracts information from recent system logs (14e and 14l) to subsequently be used for language learning. Drills are automatically generated based on recent system usage by the user, additionally the user can choose any sentence output from the system to add to his/her active learning drill (step 34c).

Figure 3:
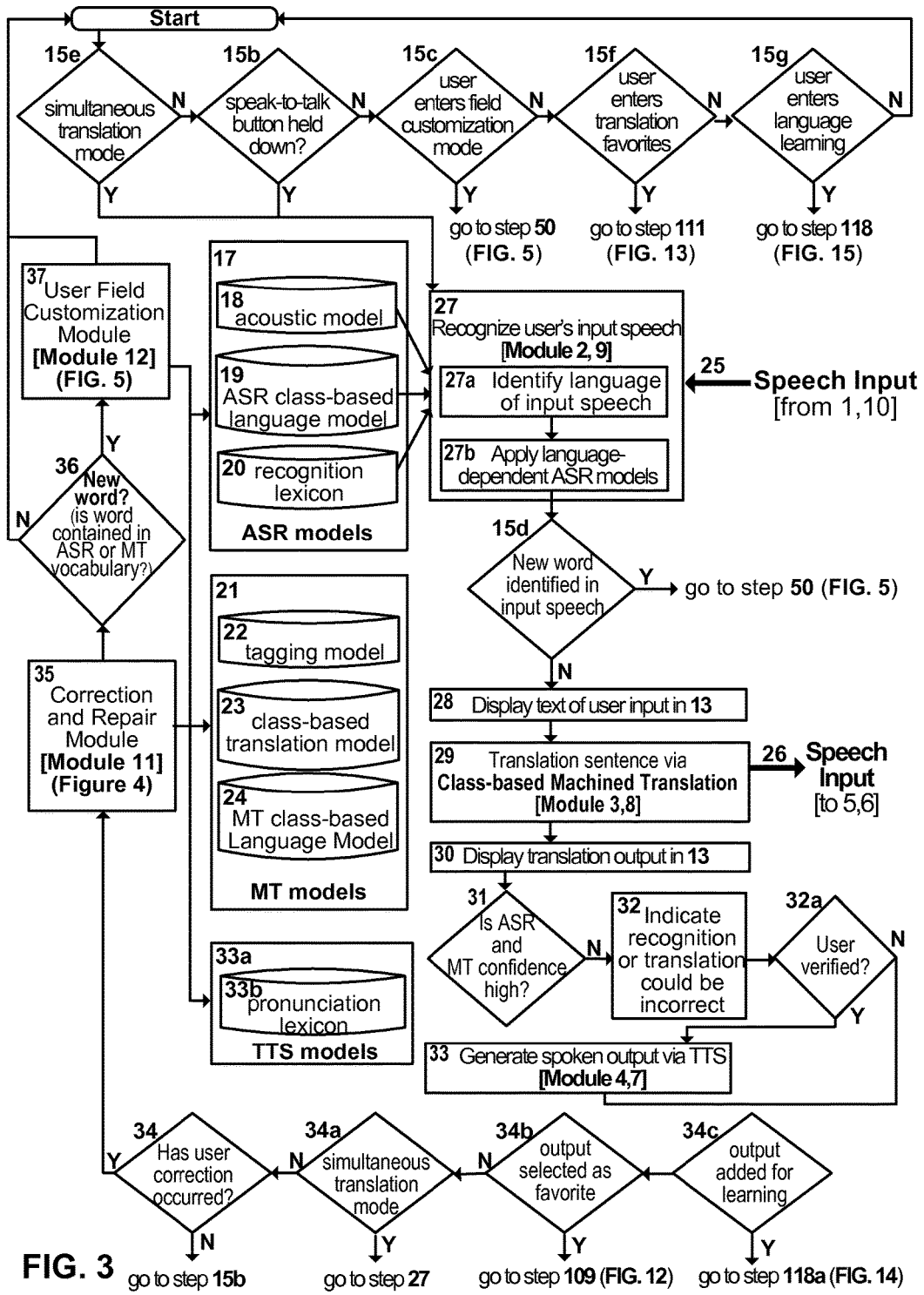
FIG. 3 is a flow chart illustrating the steps of speech-to-speech translation performed according to an embodiment of the present invention in FIG. 1.

A flow chart illustrating the operation of an example of the method of the present invention is shown in FIG. 3. First, the speech recognition system is activated by the user at step 15b. For instance, a button can be selected on the graphical user interface (FIG. 2, item 15b) or on an external physical button (not shown). The user's speech (item 25) is then recognized by one of the ASR modules in step 27; module 2, if the user is speaking $L_a$, and module 9 if the user is speaking $L_b$. The ASR modules 2 and 9 apply three models: acoustic model 18, ASR class-based language model 19 and a recognition lexicon model 20. These models are language specific and each ASR module contains its own set of models. The resulting text of the user's speech is displayed via the GUI on the device screen 13 at step 28.

Translation is then applied via MT module 3 or 8 based on the input language (step 29). MT modules 3 and 8, apply three main models: a tagging or parsing [Collins02] model to identify word classes (model 22), a class-based translation model (model 23), and a class-based language model (model 24). The tagging model 22 may be any suitable type of tagging or parsing model such as the types described in J. Lafferty, A. McCallum, and F. Pereira, "Conditional random fields: Probabilistic models for segmenting and labeling sequence data," In Proceedings of 18th International Conference on Machine Learning, pages 282-289, 2001 ("Lafferty01") or Michael Collins, "Parameter estimation for statistical parsing models: Theory and practice of distribution-free methods" (2004) In Harry Bunt, John Carroll, and Giorgio Satta, editors, New Developments in Parsing Technology, Kluwer. Other models that are applied during the machine translation include distortion models, which constrain how words are re-ordered during translation, and sentence length models. A detailed description of class-based machine translation is given below. The resulting translation is displayed via the GUI on device 13 as shown in step 30.

To help the user determine if the translation output is adequate, the automatically generated translation (FIG. 2, item 16) is translated back into the input language via MT module 3 or 8 and displayed with parentheses under the original input as illustrated for example in FIG. 2, item 15a. If the confidence of both speech recognition and translation are high (step 31) as determined by the ASR model, 2 or 9, and the MT module, 3 or 8, spoken output (item 26) is generated via loud speakers 5 or 6, via TTS modules 4 or 7 (step 33). Otherwise, the system indicates that the translation may be wrong via the GUI, audio and/or tactical feedback. The specific TTS module used in step 33 is selected based on the output language.

Thereafter, if the user is dissatisfied with the generated translation, the user may intervene during the speech-tospeech translation process in any of steps from 27 to 33 or after process has completed. This invokes the Correction and Repair Module 11 at (step 35). The Correction and Repair Module (Module 11) records and logs any corrections the user may make, which can be later used to update ASR modules 2 and 9 and MT modules 3 and 8 as described in detail further below in this document. If the correction contains a new vocabulary item (step 36), or if the user enters the field customization mode to explicitly add a new word to the system in step 15c, or if a new word is automatically detected in the input audio using confidence measures or new word models, such as the method described in Thomas Schaaf, "Detection of OOV words using generalized word models and a semantic class language model," in Proc. of Eurospeech, 2001 in step 15d; the User Field Customization Module (Module 12) is invoked.

In addition to the consecutive translation mode where the user holds down a push-to-talk button (step 15b) and speaks only a single utterance per-term, in an embodiment of the system a simultaneous translation mode will be present. In this mode no button push is required but the system continuously recognizes and translates all speech present on both microphone inputs (FIG. 1, items 1 and 10). Continuously recognition and simultaneous translation is shown by steps 15e and 34a.

In addition to the speech translation modes the user can exit the main system to enter either the "field customization" mode (step 15c), the "translations favorites" mode (step 15f), or the "language learning" mode (step 15g).

During use any sentence-pair outputted by the system can be added to the users "translations favorites" list (step 34b).

The User Field Customization Module (Module 12) provides a multimodal interface to enable users to add new words to the active system vocabulary. When a new word or phrase is added by a user the ASR, MT and TTS models (items 17, 21 and 33a) are updated as required.

A common set of classes (for example person names, place names, and organization names) is used in both ASR and MT for both languages. This provides a system-wide set of semantic slots that allows new words to be added to the system. The names, special terms and expressions that occur within these classes are the words that are most variable depending on different users' deployments, locations, cultures, customs and tasks, and thus they are in greatest need of user-customization.

In a preferred example, the specific classes used are dependent on the application domain of the system. The classes may include semantic classes for named-entities; person, place and organization names; or task-specific noun phrases; for example: names of foods, illnesses or medicines; and another open class for words or phrases that don't fit into any of the predefined classes. Syntactic classes or word equivalence classes such as synonyms could also be used. Examples of application domains include, but are not limited to, tourist, medical, peace keeping, and the like. In an example, classes required in the tourist application domain include names of persons, cities, foods and the like. In another example, for a medical professional application classes required include names of diseases, medications, anatomical names, and the like. In another example, classes required for a peace-keeping application include names of weapons, vehicles, and the like. To enable field customizable speech translation, the system permits error correction and later learning from these errors through the operation of the correction and repair module 11 in combination with a user field customization module 12.

Correction and Repair Module

Figure 4:
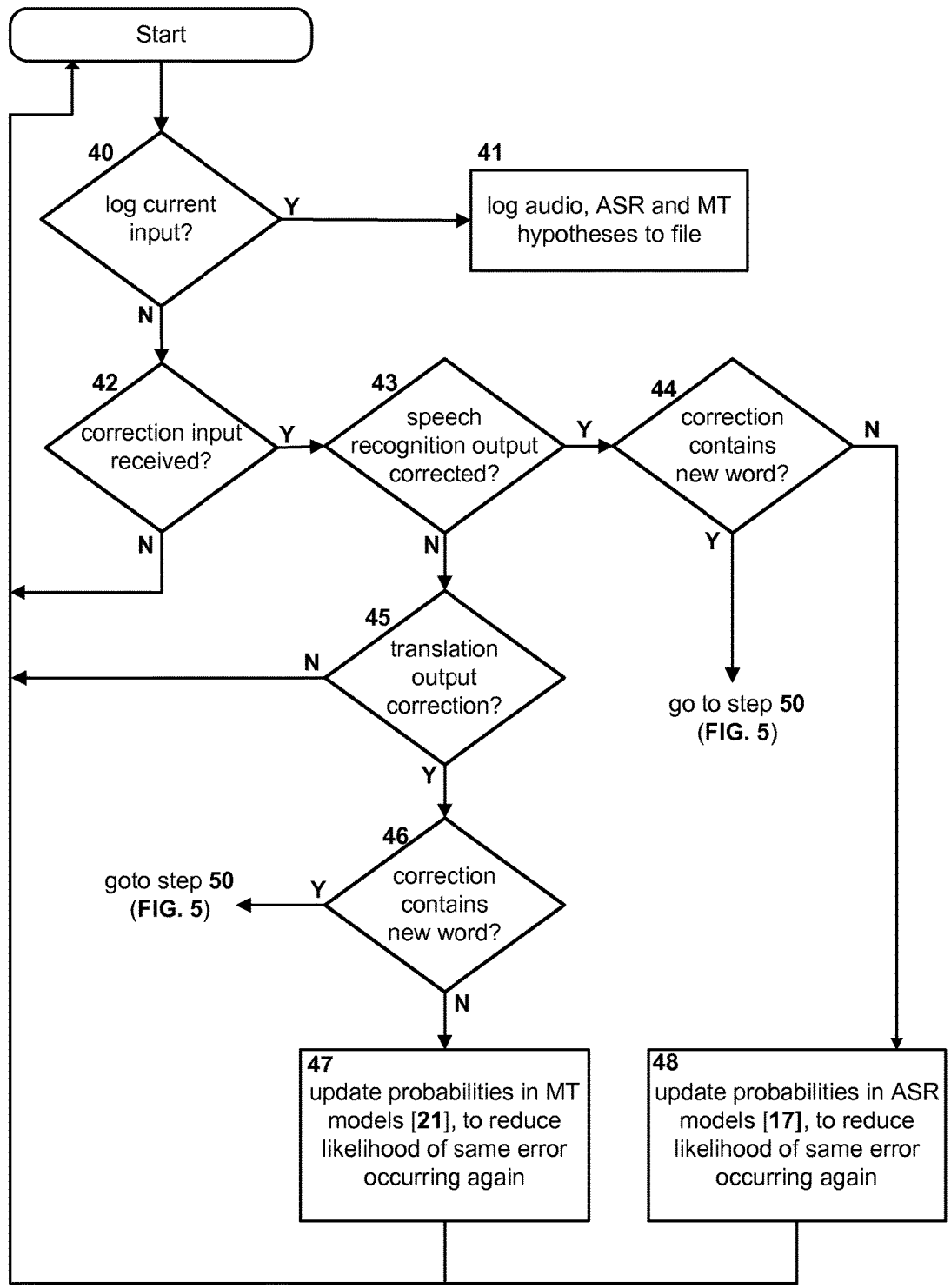
FIG. 4 is a flow chart illustrating the steps by which the system learns from corrections made by the user (Correction and Repair Module)

The Correction and Repair Module (module 11) enables a user to intervene in the speech-to-speech translation process at any time. The user may either identify and log an error, or, if he/she wishes, correct an error in the speech recognition or translation output. Such user intervention is of considerable value, as it provides immediate correction in the human-human communication process, and opportunities for the system to adjust to user needs and interests and to learn from mistakes. A flow diagram illustrating this error feedback functionality is shown in FIG. 4. If the user is dissatisfied with a translation of an utterance (i.e. an error occurs) the user can log the current input (step 40). The system will save audio of the current utterance as well as other information to a log file. This can be accessed and corrected by the user at a later time, or can be uploaded to a community database to allow expert users to identify and correct errors.

The user can also correct the speech recognition or machine translation output via a number of modalities. The user can correct the entire utterance, by re-speaking it or entering the sentence via a keyboard or handwriting interface. Alternatively a user can highlight an erroneous segment in the output hypothesis via the touch-screen, mouse or cursor keys and correct only that phrase or word, using the keyboard, handwriting, speech, or explicitly spelling out the word letter-for-letter. The user can also select an erroneous segment in the output hypothesis via the touch screen and correct it by selecting a competing hypothesis in an automatically generated drop-down list, or by reentering it by speech, or by any other complementary modality (e.g., handwriting, spelling, paraphrasing, etc.). These methods and how to suitably combine complementary repair actions build on methods proposed by Waibel, et al., in U.S. Pat. No. 5,855,000 for multimodal speech recognition correction and repair. Here they are applied to the speech recognition and translation modules of interactive speech translation systems.

Figure 5:
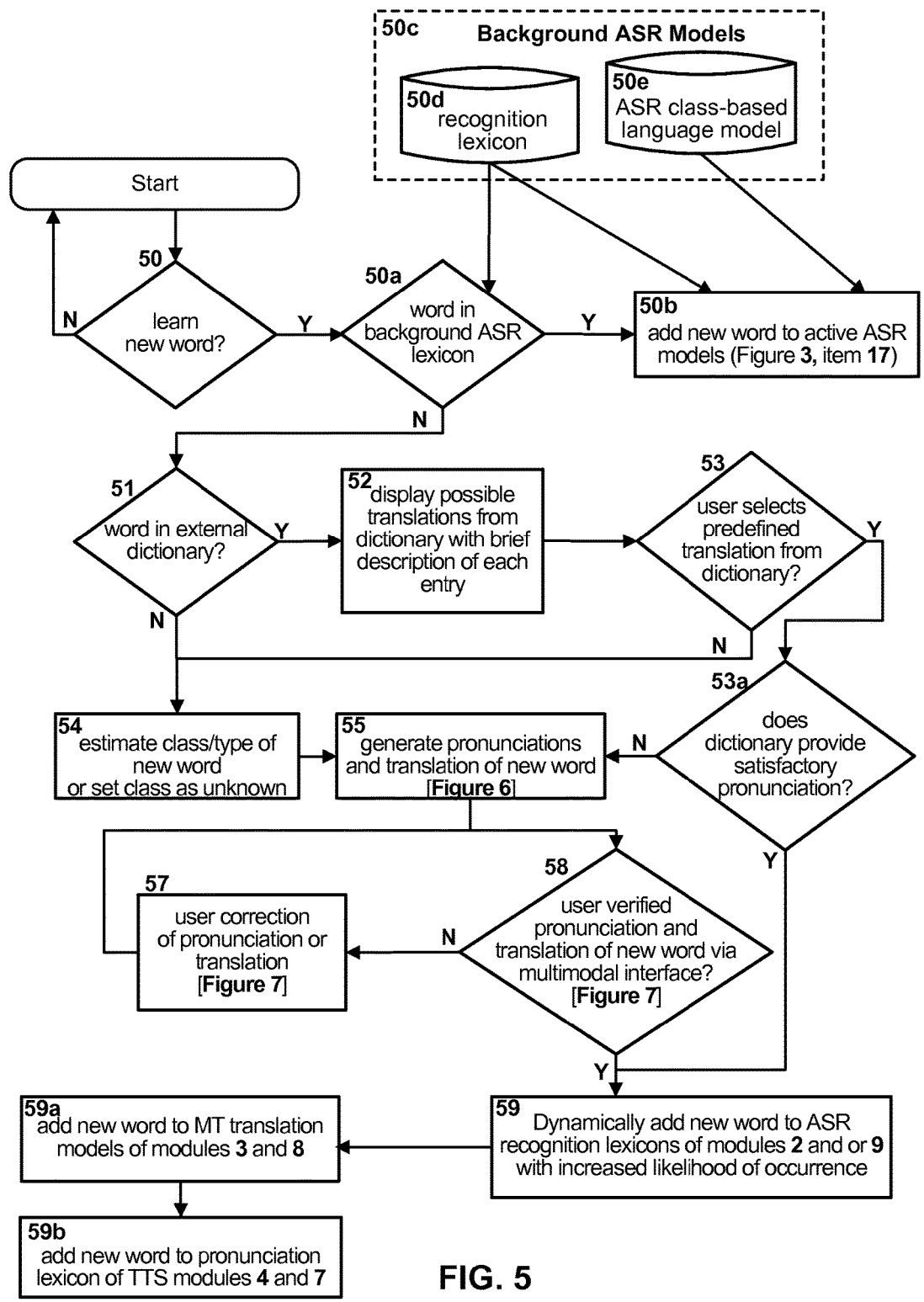
FIG. 5 is a flow chart illustrating the steps by which users can add new words to system (User Field Customization Module)

If the user corrects the speech recognition output (step 43) the system first determines if the correction contains a new word (step 44). This determination is made by checking for the word in the recognition lexicon model 20 associated with each language, $L_a$ and $L_b$. If the word is not found the system prompts the user to add the new word to the active system vocabulary if desired (FIG. 5, step 50). Otherwise, the probabilities in the ASR models (FIG. 3, item 17) are updated to reduce the likelihood of the same error occurring again. This can be performed in a discriminative manner where probabilities of the corrected word sequence are increased, and those of close-competing hypotheses are reduced.

A user can also correct the machine translation output if they have sufficient language expertise. The same modalities as used in the ASR case can be used. If the machine translation output is corrected by the user (step 45) and the correction contains a new word, then the user is prompted with a dialog enabling them to add the new word to the active system vocabulary (FIG. 5, step 50). If the correction only contains words which are already in the active system vocabulary, then the machine translation models (FIG. 3, item 21) are updated. Specifically, an implementation can be used, where phrases are extracted from the corrected sentence pair and these are folded into translation models. The target language model used can be updated in a similar way to the ASR case.

In the present invention, we introduce an abort action into the correction module. The abort action instantaneously aborts the speech-translation processes. It removes any hypotheses or partial hypotheses that may have already been output and resets the system to accept a new input. The abort action can be initiated by the user either depressing the push-to-talk button via the graphical user interface again (thus reinitiating recording for more input without waiting before the old one completes processing) or by shaking the phone to stop all processing. Output from internal accelerometers [14*a*] embedded in the hardware device or from an embedded camera [14*b*] that measures rapid shaking movement are used to determine if the device is being shaken by the user. The determination of the wrist shake by the user is then used to abort all processing that may be in progress and clear's the device's screen. The abort action can also be confirmed acoustically to the user with a crumbling paper noise, or other sound icon that confirms acoustically during field use that the speech translation process has been aborted. The simplicity of a shake of a wrist as well as the accompanying methods to confirm the abort by way of an acoustic sound icon, noise, beep, keyword or signal, provides simple fast, effective, unambiguous and intuitive signaling for both dialog partners that correction has taken place.

User Field Customization Module

User field customization module 12 enables the system to learn new words in cooperation with the user. Prior systems do not allow users to modify vocabularies in speech-to-speech translation systems. Unlike prior systems, user field customization model 12 enables the user to make incremental modifications in a running system that are relatively easy to perform for a non-expert, with minimal or no knowledge of computer speech and language processing technology or of linguistics. Model 12 offers such field customization by providing and accepting certain easy-to-understand feedback from the user, and based on this feedback deriving all the necessary parameters and system configurations autonomously. Field customization module 12 accomplishes this through: 1) an intuitive interface for user-customization, and 2) internal tools that automatically estimate all the internal parameters and settings needed for user customization, thereby relieving the user from this burden.

For unidirectional translation, the system processes a minimum of four pieces of information about the word or phrase to add a new word or phrase to the active system vocabulary. These include:

class (i.e. semantic or syntactic class of the new entry)
word in language $L_a$ (i.e. written form in $L_a$)
pronunciation of word in $L_a$
translation of word in $L_b$ (i.e. written form in $L_b$)

For a bidirectional translation, the system also requires input of the pronunciation of the new word in $L_b$. The $L_b$ enables the TTS to generate audio output and the ASR module for $L_b$ to recognize the new word.

A flow chart illustrating the steps of operation of the user field customization model 12 is shown, for example, in FIG. 5. When a new word is encountered by the system, based on a corrective intervention via the correction and repair model 11 in the previous section, it will prompt the user (FIG. 5, step 50) to determine if this word should be "learned", i.e., added to the active system vocabulary. If so, a word learning mode is activated and the field customization module 12 begins to act. Note that field customization or new-word learning need not only result from error correction dialogs. The user may also specifically choose to enter a word learning mode from a pull-down menu, to add a new word or a list of new words a priori. New word learning, could also be triggered by external events that cause a sudden need for different words, such as specialty terms, names, locations, etc. In all such instances, however, the system must collect the above information.

After the user indicates that he/she wishes to add a new word to the system vocabulary (step 50), the system first compares the word to entries in a large background recognition lexicon (item 50*d*), as listed in FIG. 5, step 50*a*. If the word is present in this lexicon then the listed pronunciations and matched n-gram entries from a large background speech recognition language model (item 50*e*) are included into the active ASR models (item 17). This step is shown in FIG. 5, step 50*b*. If the word is not present in the background recognition lexicon (item 50*d*) the system next compares the word to a large external dictionary, which is either contained locally on the device, or is a dictionary service that can be accessed via the Internet, or is a combination of both. The external dictionary consists of entries of word translation pairs. Each entry contains pronunciation and word-class information which enables the new word to be easily added to the active system vocabulary. Each entry also contains a description of each word-pair in both languages. This will allow the user to select the appropriate translation of the word, even if they have no knowledge of the target language. If the new word is contained within the external dictionary (step 51), the system displays a list of alternative translations of the word with a description of each (step 52). If the user selects one of the predefined translations from the dictionary (step 53), then they can verify the pronunciation and other information provided by the dictionary (step 53*a*), and the edit this if necessary. The phonetic pronunciation can be corrected using any suitable notation, including; IPA pronunciation, a local method of pronunciation notation, including Katakana for Japanese or Pingying for Chinese, a pseudo-phonetic spelling for English, or any other suitable phonetic notation. Since a user may not know how to write the correct phonetic spelling for a word, alternative pseudo-phonetic transcription are used in combination with synthesis to sound out the new word aloud. In this way, the user may type a name or new word according to his/her orthographic conventions, while the internal letter to sound conversion routines provide the conversion into phonetic notation based on each spelling. The word can then be played back according to the phonetic string, and if not satisfactory the user can iterate. Finally, when a satisfactory reading is achieved, the new word is then added to the active system vocabulary.

To add a new word to the active system vocabulary, three steps are required (steps 59, 59*a*, 59*b*). First the word and its translation are added to the ASR recognition lexicons of modules 2 and 9 (step 59). The word is added to this recognition lexicon 20 along with the pronunciation(s) given by the dictionary. As the user has just entered this word its probability of occurrence is set to be greater than competing members of the same class within the ASR class-based language model 19. This is to make words that were specifically added by the user more likely. Next, the word and its translation are added to the MT models (FIG. 3, item 21), enabling the system to translate the new-word in both translation directions. Finally, the word is registered with the TTS pronunciation model (FIG. 3, model 33*a*), which enables the system to pronounce the word correctly in both languages.

When the new word entered by the user is not found in the external dictionary, the system will automatically generate the information required to register the word into the active system vocabulary, and will verify this information with the user. First, the class of the new word is estimated via a tagging model (FIG. 3, model 22) using the surrounding word context if it is available (step 54). Next, the pronunciation and translation of the new word are automatically generated via either rule-based or statistical models (step 55). The resulting information is then shown to the user via a multimodal interface (step 58). The system prompts the user to verify (step 58) or correct (step 57) the automatically generated translation or pronunciation. Finally, after the user has verified this information, the new word is added to the active system vocabulary (steps 59, 59a, 59b). To dynamically add a new word (specifically, "word+pronunciation+ word class") to the ASR vocabularies (59), the recognition lexicon 20 (which is typically stored as a tree-structure, within ASR Modules 2 or 9) is searched and then updated to include the new word. This enables the new word to be added to the recognition vocabulary dynamically, and it can thus be recognized, immediately, if spoken in the following utterance. The ASR system does not need to be re-initialized or re-started as in prior systems.

Similarly, a new word (specifically, "word+translation+ word class") can be appended to the MT translation model (59a), the translation model 23 (which is can be stored as a hash-map within MT modules 3 and/or 8) is searched and an new translation-pair containing the new word its translation, and word class is appended. This enables the new word to be added to the MT modules 3 and/or 8, dynamically, and the new word will be translated correctly in proceeding utterances. The MT systems do not need to be re-initialized or re-started as in prior works.

Estimating all this information automatically is essential, so that a non-expert user in the field can perform the task of customization. In the following, we describe in detail, how this critical information about a word is estimated automatically, and then, how it can be obtained or verified intuitively from the user.

Generation of Pronunciations and Translations of New Words As users of speech-to-speech translation systems usually have limited or no knowledge of phonetics, linguistics, language technology, and often even have no knowledge of the word and its use in the other language, they cannot be expected to provide a translation and all the pertinent information (pronunciation, orthography, word use, etc.) of each new-word they wish to add to the system. Thus, when the user enters a new-word, the system estimates the word-class and generates the translation and pronunciation information of the word in both languages, automatically.

Figure 6:
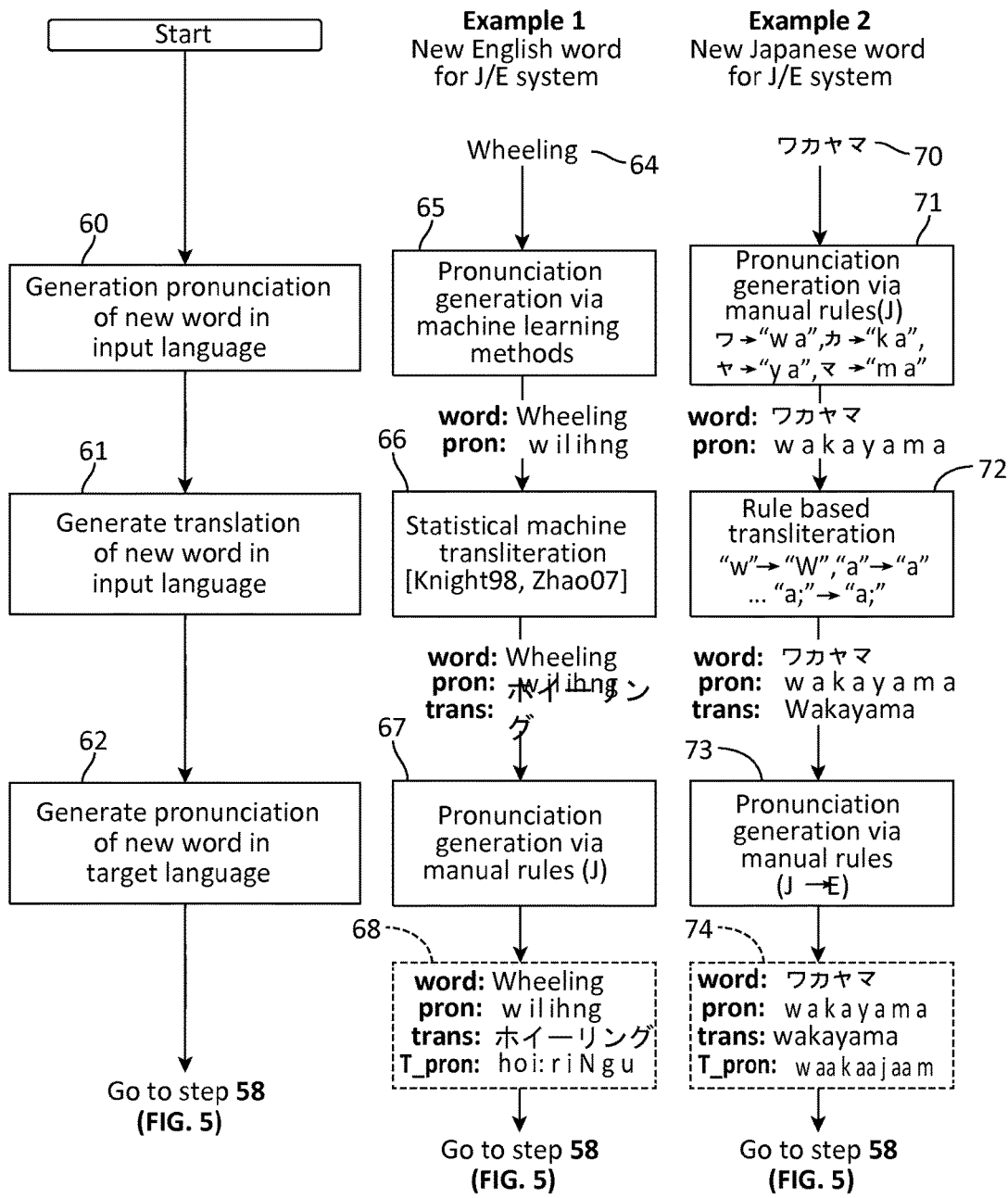
FIG. 6 is a flow chart illustrating one example of methods by which the system automatically generates the translation and pronunciations for new words the user wishes to add to the system.
Figure 7:
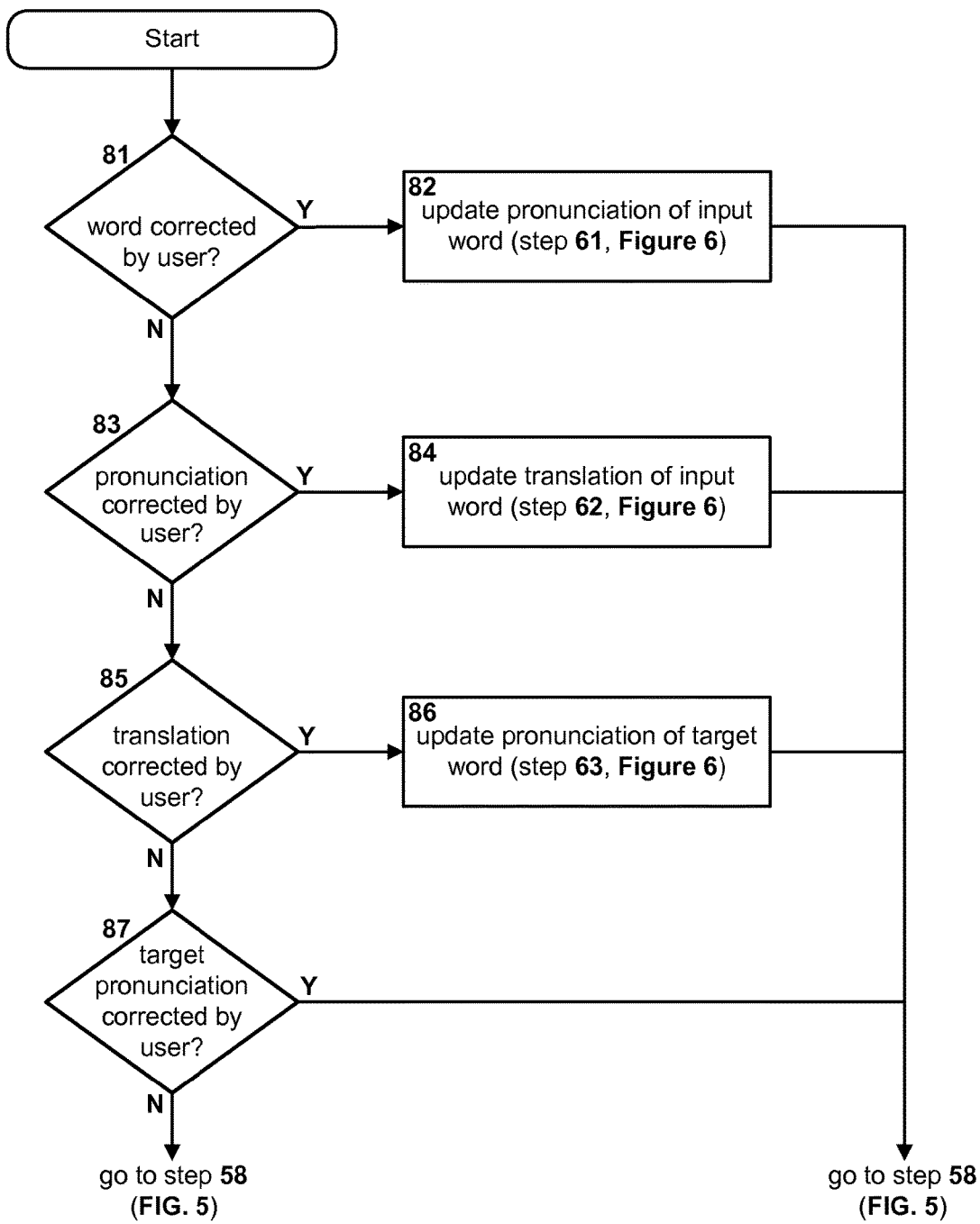
FIG. 7 is a flow chart illustrating one example of a method to verify new word input via a multimodal interface.
Figure 8:
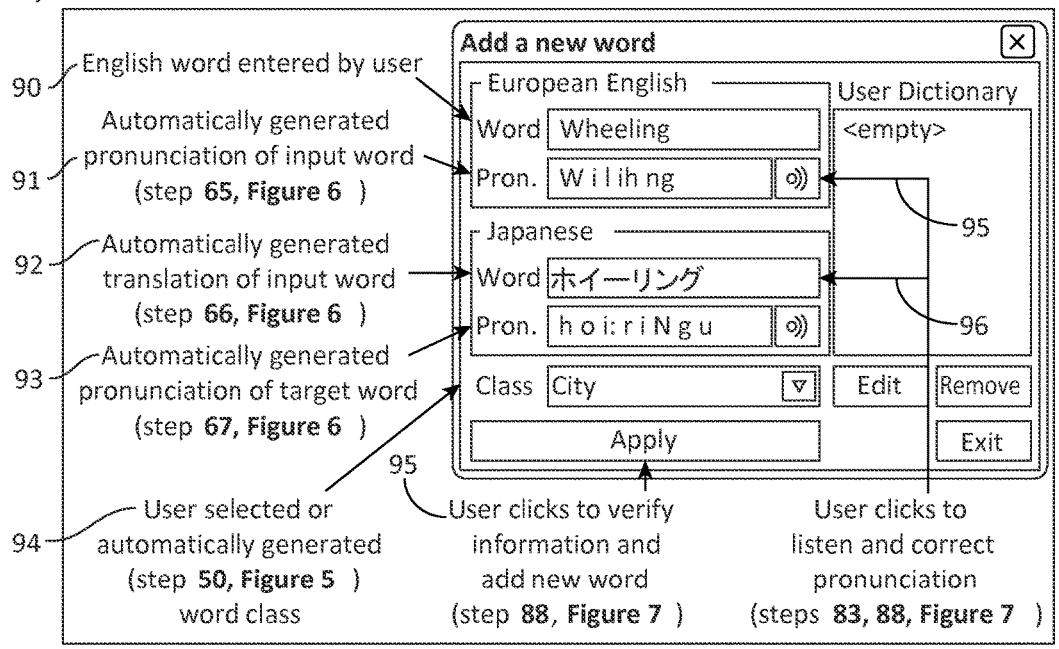
FIG. 8 illustrates an example of a visual interface to display automatically generated word information.
Figure 8:
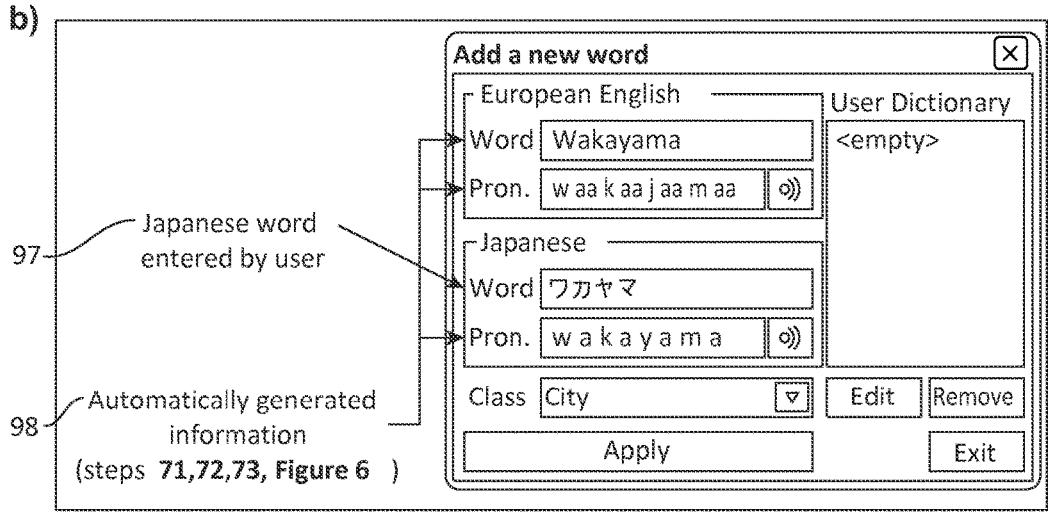
Figure 9:
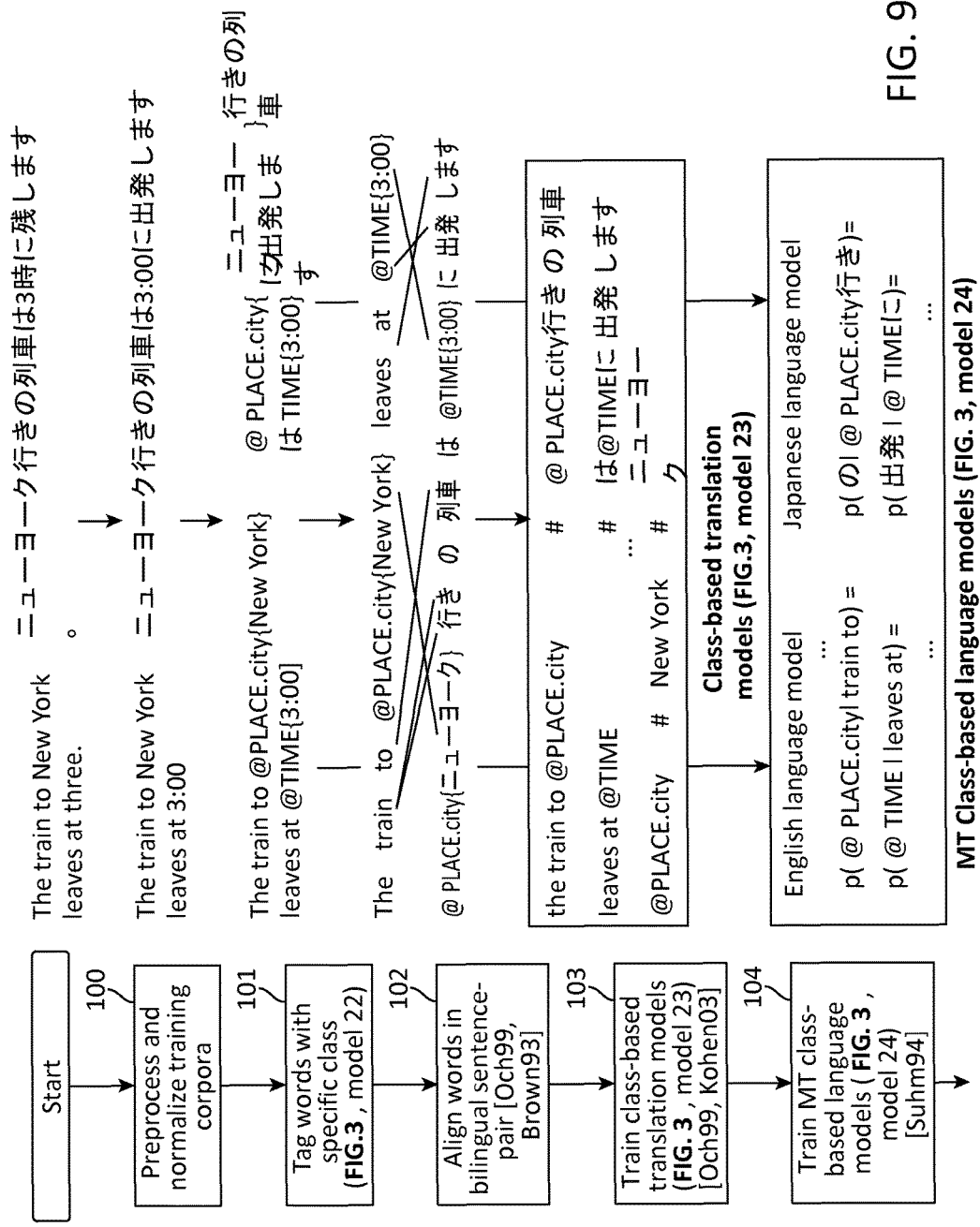
FIG. 9 is a flow chart illustrating the steps required to train class-based MT models.

To register a new word into the active system vocabulary, the translation of the word and pronunciations for both the word and its translation are required. Generating this information can be implemented as a three-step process as shown, for example, in FIG. 6. First, the pronunciation of the word is generated (step 60). Based on the character sequence of the word and its pronunciation, a translation is generated (step 61). Next, the pronunciation of the new word in the target language is generated (step 62) using information generated in previous steps. Two examples for generating this information using different techniques within a Japanese-English Field Maintainable S2S Translation System are shown on the left hand side of FIG. 6. To add a new English word "Wheeling" (item 61) to the system, first the English pronunciation is generated via machine learning (step 65). Machine learning may be conducted by any suitable technique such as those described by Damper, R. I. (Ed.), Data-Driven Techniques in Speech Synthesis. Dordrecht, The Netherlands: Kluwer Academic Publishers (2001). Next, the transliteration of this word in Japanese is automatically generated via statistical machine transliteration (step 66), and the Japanese pronunciation is then generated via manually defined rules (step 67). Transliteration may be accomplished by using any suitable statistical machine transliteration engine. Examples include those discussed by K. Knight and J. Graehl, Machine transliteration. Computational Linguistics 24 4 (1998), pp. 599-612; and Bing Zhao, Nguyen Bach, Ian Lane, and Stephan Vogel, "A Log-linear Block Transliteration Model based on Bi-Stream HMMs", to appear in HLT/NAACL-2007. The resulting information (item 68) is then verified by the user by way of acoustic playback and by the phonetic string, before registering the word into the active system vocabulary.

Similarly, to add a new Japanese word "Wakayama" (item 70) to the system, first the Japanese pronunciation is generated via manually defined rules (step 71). Next, the transliteration of this word in Japanese is automatically generated via rule-based transliteration (step 72), the English pronunciation is then generated via manually defined rules (step 73). The rule based transliteration may be performed using methods of Mansur Arbabi, Scott M. Fischthal, Vincent C. Cheng, and Elizabeth Bar, "Algorithms for Arabic name transliteration," IBM Journal of research and Development, 38(2):183 ¬ 193, 1994. The resulting information (item 74) is then verified by the user before registering the word into the active system vocabulary.

The user can verify the generated translation and pronunciation via audible output. Alternatively written form may be used if considered more suitable for the user, given their native language (i.e. in "Hanyu Pinyin" for Chinese, or "Romaji" for Japanese if the user is an English speaker). The user may edit the translation and/or pronunciation if required. Once approved by the user, the word and word characteristics are added to the multilingual system dictionary.

The system also eliminates the need for a translation of each new word that is added to the dictionary by automatically generating the required information with the assistance of interactive user input. An example of a user interface is shown in FIG. 3.

Interactive User Interface

Thereafter, the system consults the user to confirm and verify the estimated linguistic information. This is done in an intuitive manner, so as not to presume any special linguistic or technical knowledge. Thus, a suitable interface is used. In the following we describe the user interaction during new word learning.

In the interface, the user may select a "new-word" mode from the menu, or the new word learning mode could be invoked after a user correction has yielded a new/unknown word. In the window pane that appears he/she can now type the desired new word, name, special term, concept, expression. Based on the orthographic input in the user's language (this can be character sets different from English, e.g., Chinese, 64 CIP/CIP Japanese, Russian, etc.). The system then generates a transliteration in Roman alphabet and the words predicted pronunciation. This is done by conversion rules that are either hand written or extracted from preexisting phonetic dictionaries or learned from transliterated speech data. The user then views the automatic conversion and can play the sound of the generated pronunciation via US. The user may iterate and modify either of these representations (script, Romanized transliteration, phonetic transcription, and its sound in either language) and the other corresponding entries will be regenerated similarly (thus a modified transcription in one language may modify the transcription in the other).

The system further automatically selects the most likely word class that the new word belongs to based on co-occurrence statistics of other words (with known class) in similar sentence contexts. The new word window pane also allows for a manual selection (and/or correction) of this class identity, however, so that the user can override any such estimated class assessment.

In summary, given a new word/phrase from user, the system will

- Automatically classify semantic class of entry (used by ASR and MT components)
- Automatically generate pronunciation for word (used by ASR and TTS for L1)
- Automatically generate translation of word (used by both MT components)
- Automatically generate pronunciation of translation (used by ASR and TTS for L2
- Allow user to correct/edit automatically generated data as required
- Provide other modalities for user to verify if automatically generated translation is adequate. (i.e. listen to the pronunciation of the word via TTS)

If the user enters a word that does not match any of the pre-defined classes within the system, the user can assign it to the 'unknown' class. For ASR, the 'unknown' class is defined by words that occurred in the training data but not in the recognition lexicon. For SMT bilingual entries that do not occur in the translation lexicon are set to the unknown tag in the target language model.

Intra-Class Probability and Relevance Boosting

Neither of these input methods requires linguistic training and provides an intuitive way for the user to judge if a new word was suitably represented. The user may then accept this new word entry by adding the word to a "multilingual system-dictionary", that is a user's individual lexicon. The overall system merges standardized lexica with customized lexica into the user's runtime dictionary.

In addition to the above five entries, an intra-class probability $P(w|C)$ is also defined. In this fashion it is possible for the system to differentiate between words belonging to the same class. Thus words that are closer to the user's tasks, preferences and habits will be preferred and a higher intra-class probability assigned. This boosting of higher intra-class probability is determined based on relevance to the user, where relevance is assessed by observing:

- The new word entry and its regency.
- New words entered are naturally more likely to be used in the immediate future, since the user indicated that he/she wanted them by entering them, and thus intra-class probabilities are boosted (increased) over alternate existing class entries
- Correlation between the new word and user activities, interests and tasks, including
  - Distance for locations such as city names, landmarks, places of interest, etc.
  - History of past use
  - Co-occurrence statistics (Sushi correlates better with Tokyo than with Bogota)
  - General saliency of the new word, including
  - Population of cities
  - Recent mention in the Media Such observations and relevance statistics are collected based on the user's observed location, history or activity, and/or alternatively by observing the occurrence of the system's new word in a large background language resource such as the internet. Such statistics may be collected monolingually, in a data-rich language and applied to the translation dictionary and translation language model.

The relevance of boosted words may also decay over time, as the user's new activities and tasks render such words less likely over time and/or if new information (as the arrival at a different city) make a subclass of words less relevant.

Cross-Modal Entry

Optionally, a new word is entered by one of the following:

- Speaking: User speaks the new word. All information such as pronunciations and transliteration is estimated by new word models, translation models, background dictionaries as before but based on the acoustic input. The system may engage in a verbal dialog to select the class identity and other pertaining information.
- Spelling: User spells new word acoustically. This input method generally improves the likelihood of a correct transliteration over speaking it. It may also be used complementarily to speaking and other input modalities,
- Handwriting: User enters new word by handwriting. This input method generally improves the likelihood of a correct transliteration over speaking it. It may also be used complementarily to speaking, spelling, or other input modalities,
- Browsing: New words may also be selected by interactive browsing. Here the system may propose related, relevant new words by searching the internet for texts with similar statistical profiles as the user's recent usage history and/or recent selected entered new words.

Remote New Word Learning and Shared Lexicon Development Over the Internet

The methods described in the previous sections are all aimed at allowing an individual user to customize a speech translation system to his/her individual needs and tasks in the field. Many of such user customizations could, however, be useful to other users as well. In an embodiment, user customizations are uploaded to a community wide database, where names, special terms, or expressions are shared between interested parties. The vocabulary entries, translations and class tags are collected and related to similarly interested communities. Subsequent users can download these shared community resources and add as resource to their own system.

Alternatively, users may choose to only upload poorly translated sentences, to request manual translation from the community. For such incorrect or incomplete source words or sentences and their missing or incorrect translations other human users can provide online correction and translation on a volunteer (or paid fee) basis. The resulting corrections and translations are once again resubmitted into the updated shared community translation database.

Unsupervised Adaptation

After correction, repair and new word learning, finally, we obtain a corrected hypothesis, and thus a true transcript or translation of a spoken sentence. The speech-to-speech translation device or system automatically can use the fact that such ground truth has been provided to further adapt the ASR modules (FIG. 1, module 2 or 9) to the primary user of the device. Such adaptation is designed to improve the accuracy and usability of the device. Two specific methods of adaptation are performed. First, adaptation of the system to better recognize the user's voice; acoustic model and pronunciation model adaptation, and second, adapting to the user's style of speech by way of language model adaptation. Profiles are used to store adaptation data for specific users and can be switched in the field.

Class-Based Machine Translation

In the previous sections, we have described error repair and new word learning. In these modules, reference was made to class-based machine translation. In the following, we describe the detailed functioning of such class-based machine translation.

The Approach

State of the art machine translation systems perform translation on the word-level. This is evident from prior translation systems including those described in the following three documents; (1) P. Koehn, H. Hoang, A. Birch, C. Callison-Burch, M. Federico, N. Bertoldi, B. Cowan, W. Shen, C. Moran, R. Zens, C. Dyer, O. Bojar, A. Constantin, and E. Herbst, 'Moses: Open source toolkit for statistical machine translation', In Proc. ACL, 2007 ("[Koehn07"); (2) D. Chiang, A. Lopez, N. Madnani, C. Monz, P. Resnik and M. Subotin, "The Hiero machine translation system: extensions, evaluation, and analysis,", In Proc. Human Language Technology and Empirical Methods in Natural Language Processing, pp. 779-786, 2005 ("Chiang05"); and (3) K. Yamada and K. Knight "A decoder for syntax-based statistical MT". In Proc. Association for Computational Linguistics, 2002 ("Yamada02"). Alignment is performed word-to-word; translation examples, or phrase-pairs are matched at the word level; and word-based language models are applied. Hierarchical translation modules such as those in Chiang05, and syntax-based translation models such as in Yamada02, extend on this by introducing intermediate structure. However, these approaches still require exact word matches. As each word is treated as a separate entity, these models do not generalize to unseen words.

One embodiment of class-based machine translation is class-based statistical machine translation, in which a foreign language sentence $f_1^J = f_1, f_2, \ldots, f_J$ is translated into another language $e_1^I = e_1, e_2, \ldots, e_I$ by searching for the hypothesis $\hat{e}_1^I$ with maximum likelihood, given:

$$\hat{e}_1^I = \text{argmax } P(e_1^I | f_1^J) = \text{argmax } P(f_1^J | e_1^I) \cdot P(e_1^I)$$

Classes can be semantic classes, such as named-entities, syntactic classes or classes consisting of equivalent words or word phrases. As an example we describe the case when named-entity classes are incorporated into the system.

The two most informative models applied during translation are the target language model $P(e_1^I)$ and the translation model $P(f_1^J | e_1^I)$. In a class-based statistical machine translation framework $P(f_1^J | e_1^I)$ is a class-based translation model (FIG. 3, model 23), and $P(e_1^I)$ is a class-based language model (FIG. 3, model 24).

Figure 10:
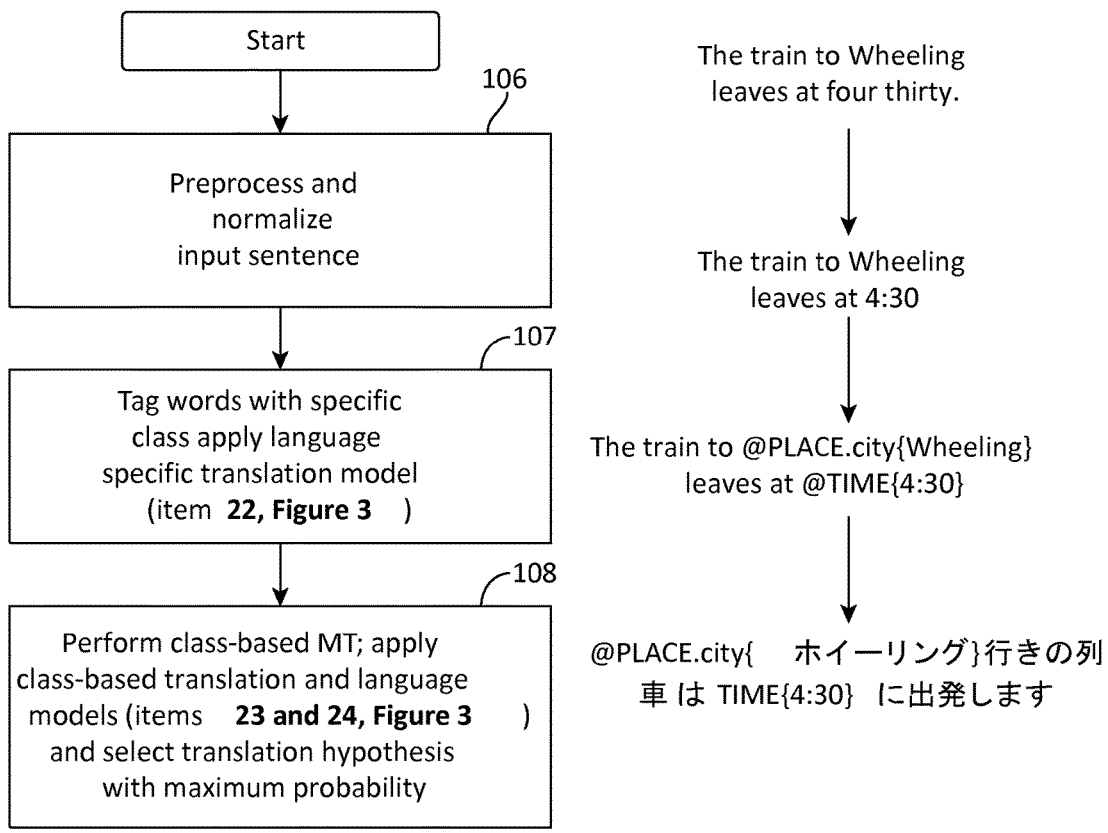
FIG. 10 is a flow chart illustrating the steps of applying class-based MT to an input sentence.

Class-based models for a statistical machine translation framework can be trained using the procedure shown in FIG. 10. First, the training corpora of sentence pairs are normalized (step 100) and tagging models (FIG. 3, model 22) are used to tag the corpora (step 101). One approach to do this is described in Lafferty01. In this step, sentences that combine to form a training-pair can be tagged independently, tagged jointly, or tags from one language can be projected to the other. After the entire training corpus is tagged, words within sentence-pairs are aligned (step 102). Alignment can be accomplished using current approaches such as those described by Franz Josef Och, Christoph Tillmann, Hermann Ney: "Improved Alignment Models for Statistical Machine Translation"; pp. 20-28; Proc. of the Joint Conf. of Empirical Methods in Natural Language Processing and Very Large Corpora; University of Maryland, College Park, Md., June 1999; and Brown, Peter F., Stephen A. Della Pietra, Vincent J. Della Pietra, and R. L. Mercer. 1993. "The mathematics of statistical machine translation: Parameter estimation," Computational Linguistics, vol 19(2):263-311. In this step, multi-word phrases within a tagged entity (i.e. "New York") are treated as a single token. Next, phrases are extracted (step 103) using methods such as Koelm07 to generate class-based translation models (FIG. 3, model 23). The tagged corpus is also used to train class-based target language models (FIG. 3, model 24). Training may be accomplished using a procedure such as that described in B. Suhm and W. Waibel, "Towards better language models for spontaneous speech' in Proc. ICSLP-1994, 1994 ("Suhm94"). (step 104).

Figure 11:
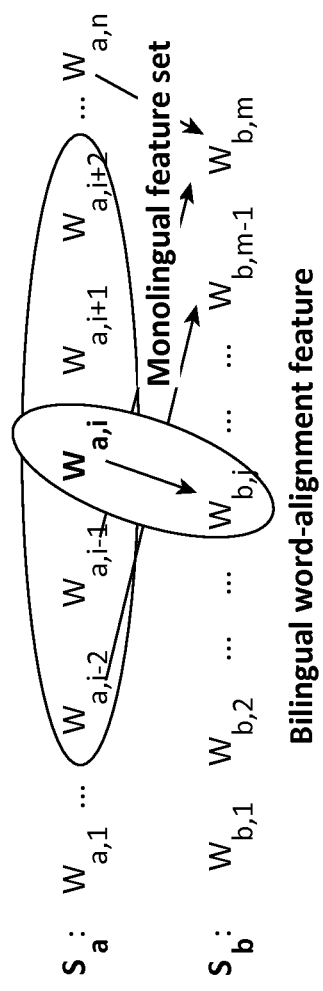
FIG. 11 is a diagram illustrating possible features used during word-class tagging via statistical or machine learning approaches.
Figure 12:
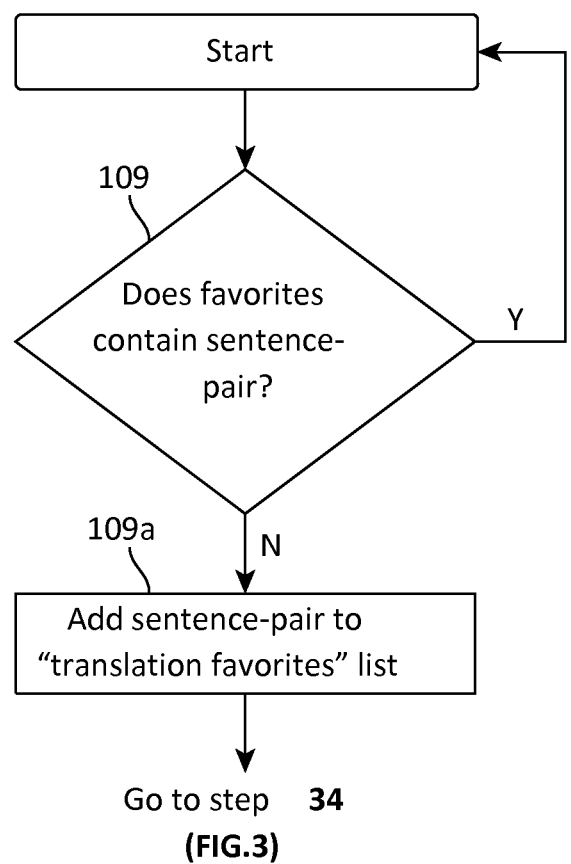
FIG. 12 is a flow chart illustrating the steps required to add an output sentence-pair from the speech translation system to a translation favorites list.

To translate an input sentence the method illustrated in FIG. 11 is applied. First, the input sentence is normalized (step 105) and tagged (step 106) using a similar procedure as that applied to the training corpora. The input sentence is tagged using a monolingual tagger (FIG. 3, model 22). Next, the input sentence is decoded using class-based MT models (FIG. 3, models 23 and 24). For class-based statistical machine translation decoding is performed using the same procedure used in standard statistical machine translation, However, phrase-pairs are matched at the class-level, rather than the word, as shown in the example below.

Given the tagged input sentence:

the train to @PLACE.city {Wheeling} leaves at @TIME {4:30} the following phrases can be matched:

| train | # | 列車 |
| leaves | # | 出発 |
| @PLACE.city | # | @PLACE.city |
| @TIME | # | @TIME |
| at @TIME | # | @TIMEに |
| the train to @PLACE.city | # | @PLACE.city行き |
| の列車 | | |
| leaves at @TIME | # | は @TIMEに 出発 |
| します | | | word or phrases within a class (i.e.: @PLACE.city {wheeling}, @Time {4:30}) are either passed directly through, which is the case for numbers/times, or the translation is determined from the translation model. Users can add new words to the translation model via the "User Field Customization Module" (FIG. 1, module 12). If the user had previously added the city name "Wheeling" (as detailed in the example in FIG. 6), then the translation model will also contain the following phrase:

| @PLACE.city | # | Wheeling | # |
| ホイーリング | | | |

Search is performed to find the translation hypothesis with maximum likelihood $P(f_1^J | e_1^I) \cdot P(e_1^I)$ given the translation model probability $P(f_1^J | e_1^I)$ (FIG. 3, model 23) and the MT class-based language model probability $P(e_1^I)$ (FIG. 3, model 24).

Given the above input sentence and phrases the resulting translation will be:

@PLACE.city { ホイーリング 行きの □□□ @TIME(4:30} に出発します which is a correct translation of the input sentence.

In this example, even though the word "Wheeling" did not appear in the training corpora, after the user has entered the word via the "User Field Customization Module" (FIG. 1, module 12) the system is able to correctly translate the word. Furthermore, as the word-class is known (in this example "@PLACE.city") the system is able to select better translations for surrounding words and will order the words in the translation output correctly.

Parallel Tagging of Multilingual Corpora

In an embodiment, a labeled parallel corpora is obtained by independently tagging each side of the training corpora with monolingual taggers and then removing inconsistent labels from each sentence-pair. In this approach, for each sentence-pair (Sa,Sb) the label-sequence-pair (Ta,Tb) is selected which has maximum conditional probabilities P(Ta, Sa) and P(Tb,Sb). If the occurrence count of any class-tag differs between P(Ta,Sa) and P(Tb,Sb), that class-tag is removed from the label-sequence-pair (Ta,Tb). One method to estimate P(Ta,Sa) and P(Tb,Sb) is by applying conditional random field-based tagging models Lafferty01. An example of a feature set used during monolingual tagging is shown in FIG. 11.

In an embodiment, labeling consistency across sentence-pairs can be further improved by using the target word extracted from word-alignment (wb,j in FIG. 11), in addition to monolingual features.

In another embodiment, both sentences in the translation-pair are jointly labeled while applying the constraint that the class-tag sets must be equivalent. Specifically, for the sentence-pair (Sa,Sb) we search for the label-sequence-pair (Ta,Tb) that maximizes the joint maximum conditional probability $$\lambda a\ P(Ta,Sa) - \lambda b\ P(Tb,Sb) \quad \text{where, } Oi(Ta)= Oi(Tb) \text{ for } 1 \leq i \leq M$$

Oi(Ta)  occurrence count of class-tag i in label sequence Ta (number of entities, not word count)
M       total number of classes
λa, λb  scaling factors if the performance of the monolingual models differ significantly, Xa and Xb can be optimized to improve bilingual tagging performance.

In an embodiment, in the case where no manually annotated corpora is available for a specific language, labels can be generated by projecting labels from a first language where labels are known, across the sentence-pairs in the training corpora to the non-annotated language. One approach to do this is described in D. Yarowsky, G Ngai and R. Wicentowski, "Inducting Multilingual Text Analysis Tools via Robust Projection across Aligned Corpora," In Proc. HLT, pages 161-168, 2001 ("Yarowsky01").

Example System and Evaluation of Class-based Machine Translation

Through experimental evaluation, we show that class-based machine translation, as detailed above, improves translation performance compared to previous approaches. Furthermore, we show that by using the parallel tagging approach described above, translation accuracy is further improved.

A system for translation between Japanese and English developed for the tourist domain was evaluated. A description of the training and testing data is shown in Table 1.

TABLE 1

Training and Test Data

|  | English | Japanese |
| --- | --- | --- |
| Parallel Training Corpora | | |
| number of sentence-pairs | 400k | |
| number of tokens | 3,257k | 3,171k |
| average sentence length | 8.7 | 8.5 |
| Manually tagged training data (subset of above data) | | |
| training (no. sentence-pairs) | 12600 | |
| held-out Test (no. sentence-pairs) | 1400 | |
| Test set | | |
| number of sentence-pairs | 600 | |
| number of tokens | 4393 | 4669 |
| average sentence length | 7.3 | 7.8 |
| OOV rate | 0.3% | 0.5% |

To realize effective class-based SMT, accurate and consistent tagging across sentence-pairs is vital. We investigated two approaches to improve tagging quality; first, the introduction of bilingual features from word-alignment; and second, bilingual tagging, where both sides of a sentences-pair are jointly tagged. From the parallel training corpora 14,000 sentence-pairs were manually tagged using the 16 class labels indicated in Table 2.

TABLE 2

Classes Used in Evaluation System

| Class | Class labels |
| --- | --- |
| Number | cardinal, ordinal, sequence, letter |
| Time | time, date, day, month |
| Person | first name, last name |
| Place | city, country, landmark |
| Organization | airline, hotel, company name |

From this manually labeled set, we selected 10% (1400 sentence-pairs) which contained one or more tags as held-out data to evaluate tagging accuracy.

First, the performance of the baseline, monolingual CRF-based taggers was evaluated. Each side of the held-out set was labeled independently, using language dependent models. The output was then compared to the manual reference. The tagging accuracy for various metrics are shown in Table 3.

TABLE 3

Monolingual and Bilingual Tagging Accuracy on Held-Out Training Set

| | English | | | Japanese | | | Bilingual | | | % correctly tagged sentence- |
| --- | --- | --- | --- | --- | --- | --- | --- | --- | --- | --- |
| Tagging Scheme | P | R | F | P | R | F | P | R | F | pairs |
| monolingual | 0.95 | 0.89 | 0.92 | 0.94 | 0.88 | 0.91 | 0.88 | 0.80 | 0.84 | 80% |
| +alignment features | 0.97 | 0.85 | 0.91 | 0.98 | 0.93 | 0.95 | 0.95 | 0.82 | 0.88 | 82% |

TABLE 3-continued

Monolingual and Bilingual Tagging Accuracy on Held-Out Training Set

| Tagging Scheme | English | | | Japanese | | | Bilingual | | | % correctly tagged sentence-pairs |
|---|---|---|---|---|---|---|---|---|---|---|
| | P | R | F | P | R | F | P | R | F | |
| +remove inconsistent tags | 0.99 | 0.83 | 0.90 | 0.99 | 0.82 | 0.90 | 0.99 | 0.81 | 0.89 | 82% |
| bilingual tagging | 0.98 | 0.92 | 0.95 | 0.98 | 0.92 | 0.95 | 0.97 | 0.90 | 0.93 | 92% |
| +alignment features | 0.98 | 0.93 | 0.96 | 0.98 | 0.93 | 0.96 | 0.98 | 0.92 | 0.95 | 92% |

For the bilingual tagging, a tag is considered correct if the entity is correctly labeled on both sides of the corpora. The right hand column indicates the percentage of sentence-pairs in which both sides were tagged correctly. Although the F-score is above 0.90 for the independent languages, the bilingual tagging accuracy is significantly lower at 0.84, and only 80% of the sentence-pairs were correctly tagged. Incorporating alignment features into the monolingual taggers improved precision for both languages and significantly improvement recall for the Japanese side, however, the percentage of correctly tagged sentence-pairs increased only slightly. Removing inconsistent tags across sentence-pairs improved precision, but the number of correctly tagged sentence-pairs did not improve.

Next, the effectiveness of bilingual tagging was evaluated using the approach described above. The tagging accuracy of this approach, and when word alignment features were incorporated are shown in the lower 2 rows of Table 3. Compared to the monolingual case, bilingual tagging significantly improved tagging accuracy. Not only did tagging consistency improve (the F-score for bilingual tagging increased from 0.84 to 0.95), but the tagging accuracy on both the English and Japanese-sides also improved. Incorporating word-alignment features gained a further small improvement in tagging accuracy for all measures.

The effectiveness of the system was further evaluated by comparing the performance of three class-based systems and a baseline system that did not use class models.

For the baseline system phrase-based translation models were trained using the Moses toolkit such as described in Koehn05 and GIZA++(such as that used by Franz Josef Och, Hermann Ney. "A Systematic Comparison of Various Statistical Alignment Models", Computational Linguistics, volume 29, number 1, pp. 19-51 March 2003). 3-gram language models were trained using the SRILM toolkit of A. Stolcke "SRILM—an extensible language modeling toolkit", In Proc. of ICSLP, pp. 901-904, 2002. Decoding was performed using our PanDoRA decoder. The decoder is described in Ying Zhang, Stephan Vogel, "PanDoRA: A Large-scale Two-way Statistical Machine Translation System for Hand-held Devices," In the Proceedings of MT Summit XI, Copenhagen, Denmark, Sep. 10-14, 2007. Systems were created for both translation directions J→E (Japanese to English) and E→J (English to Japanese) using the training set described in Table 1. The data used to train the target language models were limited to this corpora. The translation quality of the baseline system was evaluated on a test-set of 600 sentences. One reference was used during evaluation. The BLEU-score for the J→E and E→J systems were 0.4381 and 0.3947, respectively. BLEU-score is described in Kishore Papineni, Salim Roukos, Todd Ward and Wei-Jing Zhu "BLEU: a Method for Automatic Evaluation of Machine Translation, "In Proc. Association for Computational Linguistics, pp. 311-318, 2002. Translation quality using three different tagging schemes was evaluated:

+num: 8 classes related to numbers, times

+NE-class: above, +8 classes for named-entities

+Bi-Tagging: above 16 classes, training corpora tagged bilingually

Monolingual tagging was applied for the +num and +NE-class cases, and tags that were inconsistent across a sentence-pair were removed. In the +Bi-Tagging case, bilingual tagging incorporating word alignment features were used. For each tagging scheme, the entire training corpora was tagged with the appropriate set of class-labels. Class-based translation and language models were then trained using an equivalent procedure to that used in the baseline system. During testing the input sentence was tagged using a monolingual tagger. All named-entities in the test set were entered into the user dictionary to be used during translation.

The performance on the 600 sentence test-set for the baseline and class-based systems are shown in terms of BLEU-score for the J→E and E→J systems in Table 4.

TABLE 4

Translation Quality of Class-based SMT

| System | Translation Quality (BLEU [Papineni02]) | |
|---|---|---|
| | J→E | E→J |
| Baseline | 0.4381 | 0.3947 |
| +num | 0.4441 | 0.4104 |
| +NE-class | 0.5014 | 0.4464 |
| +Bi-Tagging | 0.5083 | 0.4542 |

The class-based SMT system using number and time tags (+num), obtained improved translation quality compared to the baseline system for both translation directions. For these models, BLEU-scores of 0.4441 and 0.4104 were obtained. When a class-based system using named-entity classes in addition to number and time tags was applied, translation quality improved significantly. BLEU-scores of 0.5014 for the J→E system and 0.4464 for the E→J case were obtained. When bilingual tagging was used to tag the training corpora (+Bi-Tagging) a further 0.8 point gain in BLEU was obtained for both translation directions. On the 14% of sentences in the test-set which contained one or more named-entities the (+Bi-Tagging) system outperformed the monolingually tagged system ("+NE-class") by up to 3.5 BLEU points.

While the foregoing has been set forth in considerable detail, it is to be understood that the drawings and detailed embodiments are presented for elucidation and not limitation. Design and configuration variations may be made but are within the principles of the invention. Those skilled in the art will realize that such changes or modifications of the invention or combinations of elements, variations, equivalents, or improvements therein are still within the scope of the invention as defined in the appended claims.

Speech Translation Favorites

Frequently, users may say the same phrase or sentence repeatedly in a field situation. To eliminate the need to re-speak the same phrases and sentences over and over again, embodiments of the invention provide a speech translation favorites module, which stores frequently used phrases for rapid play-back. This favorites modules differs from a plain list or phrase book in one most important aspect: it gets filled and built by the speech translation device, and thus, does not require a bilingual speaker to be on hand to know the correct translation to a term or phrase. The favorites module is programmed to enable a user to perform the following functions: Copy bilingual sentence-pair from the speech translation interaction window to a favorites list; provide editing capability to the newly copied bilingual sentence-pair, so a user can modify both input and output string; and provide the ability to play back the target language side of the added sentence pair by applying the synthesis module. With the favorites list in place, a user can simply play back various accumulated phrases from the favorites list, without, speaking them first, invoking them by clicking on the selected favorite or by way of a voice command or key phrase. This saves time in field situations. At the same time the favorites list provides the full flexibility of a full two-way speech-to-speech translator since it does not require a linguistically trained expert knowledgeable of both languages to build such a list. A customized list can be built by the user in the field and on the fly.

Figure 13:
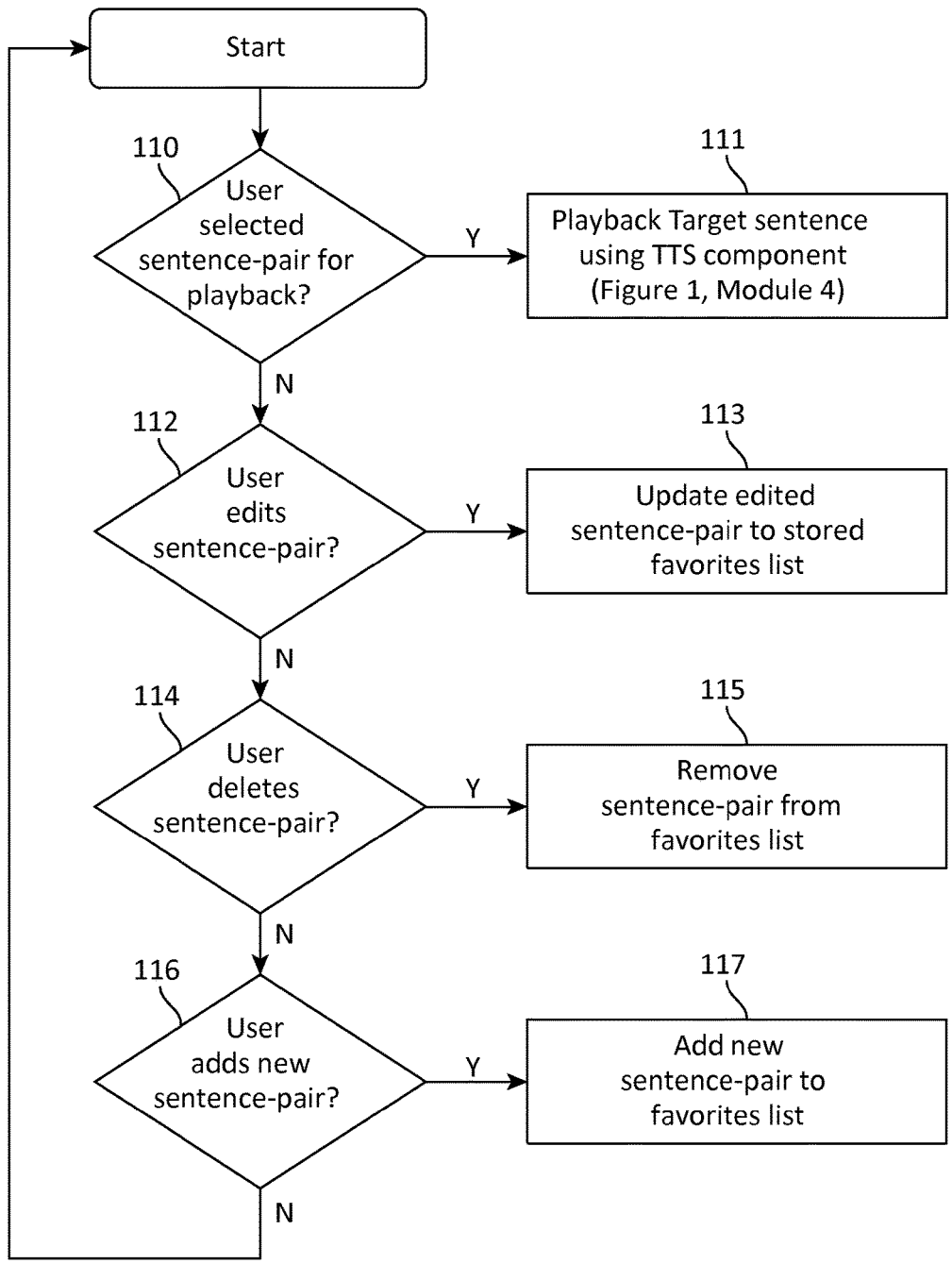
FIG. 13 is a flow chart illustrating the steps required to playback, edit, add or delete a sentence-pair in the translations translation favorites list.
Figure 14:
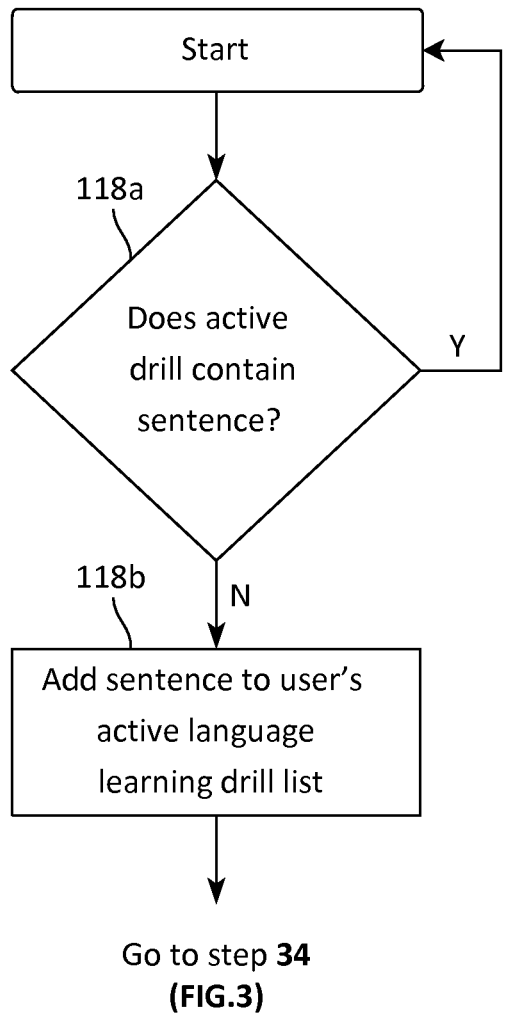
FIG. 14 illustrates an example of the steps required to add an output sentence from the speech translation system to an active language learning drill.
Figure 15:
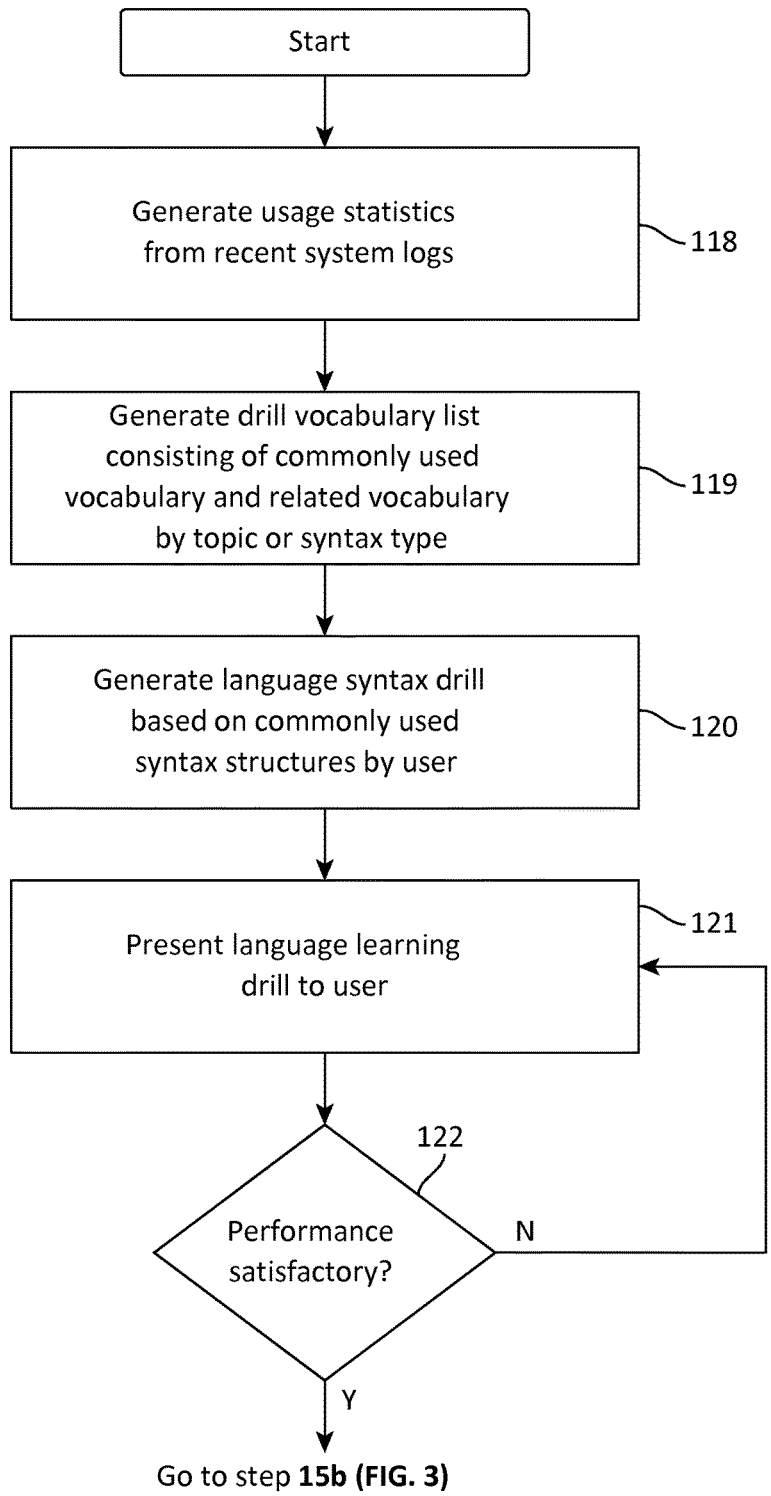
FIG. 15 illustrates an example of the steps required in a language learning module to present language learning drills to a user.
Figure 16:
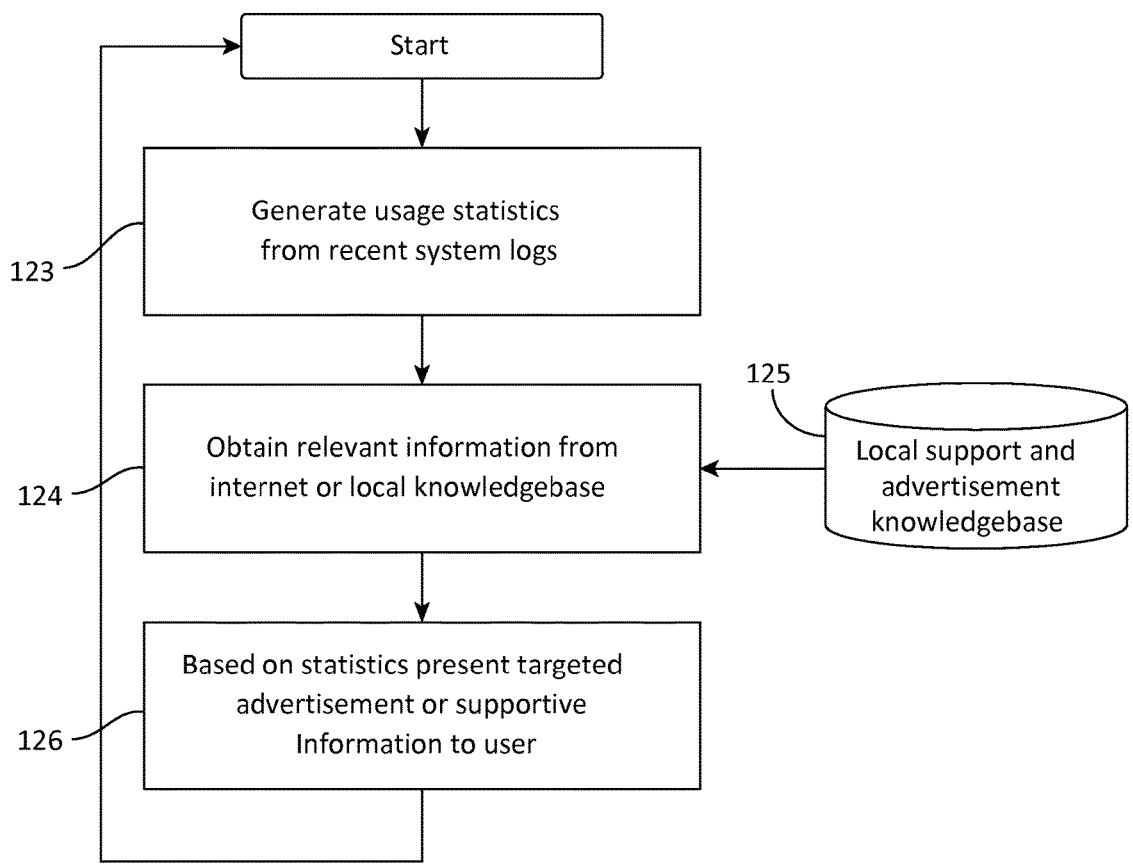
FIG. 16 illustrates an example of the steps required in an information extraction module to present targeted advertisements or supportive information to a user.
Figure 17:
FIG. 17 illustrates an example of a graphical user interface for a "translation favorites" list.
Figure 18:
FIG. 18 illustrates an example of a graphical user interface for adding phrases generated by the speech translation system to a user's "translation favorites" list.

In addition to the basic speech translation system shown in FIG. 1 an embodiment of this system will add additional functionality to allow users to playback predefined phrases via TTS (FIG. 1, modules 3 and 7). An example graphical user interface for this functionality is shown in FIG. 16. While using the speech translation system the users can select any output generated by the system and add this to their favor list (step 34b). The system will check if the sentence-pair already exists in the "Translation Favorites" list (step 109) and if not will append it (step 109a). A possible graphical user interface for this phrase-addition step is shown in FIG. 13. In this example the user can press a graphical button (item 127) to add the current bilingual sentence-pair to the user's "Translation Favorites" list. Instead of performing speech translation, the user can enter the "Translations Favorites" mode (step 15f). In this mode (detailed in FIG. 13) The system allows users to select a sentence-pair for playback (steps 110, 111), edit sentence-pairs currently in the list (steps 112,113), delete a sentence-pair from the list (steps 114, 115) or append a sentence-pair to the list (steps 116, 117) by typing in the required information.

Speech Translation Modes

Even when performing speech translation limited to one language pair, there are variations in language use, vocabularies and speaking style depending on many factors, including (without limitation) social situation, dialect, relative relations between the speakers, social relationship between speakers, gender and age of speaker or listener, location or speaker and listener, activity, environment, regional expression and context that are typically not differentiated by a standardized speech translator. Yet, it is in many ways critically important to separate them to achieve socially appropriate results. Thus, the same user may speak formally in a formal context at work, in an informal colloquial manner at home with his/her family, and use slang at a party with friends. Similarly, there may be situational differences, such as authoritative or submissive speaking, depending on whether the device is used by a police/military officer on duty or as a clerk in a department store. In addition to language choices, we introduce a language "mode". This mode operates like a switch that switches the device into the appropriate speaking mode, and modifies/conditions the modeling of several system subcomponents accordingly. Language modes then affect the operation of the system, by applying language-mode dependent ASR, MT and TTS models, or by simply filtering the output of ASR and MT components. The choice of a mode is given to the user by a mode switch or setting ("polite", "informal", etc.) or by inferring the appropriate mode perceptually (for example, the gender or a speaker, his/her location, his/her level of formality, etc.).

The basic speech translation system shown in FIG. 1 performs speech recognition (modules 2 and 9) using a single set of ASR models per language, machine translation (modules 3 and 8) using a single set of MT models per language-pair, and speech generation (modules 3 and 7) using a single set of TTS models per language. In one embodiment of this system, multiple language mode-dependent models will be available to the system rather than a single set of models. Specific models (ASR, MT and 'ITS) are developed for specific modes of communication including formal/colloquial/slang/rude, authoritative/submissive, and standard/dialectal language. Users either explicitly specify which mode they wish to use via the graphical user interface or the language mode can be estimated in the User Field Customization Module (item 12), based on device location, input speech or discourse history. Different language modes will generate different translation and speech output depending on the communication-style they are tuned towards, and will constrain the speech recognition components to the type of language used in that communication-style. In another embodiment, different language modes will be realized by simply filtering the output of the speech recognition (modules 2 and 9) and machine translation components (modules 3 and 8). For example while in formal mode, slang or rude phrases will be filtered from the ASR and MT output, be replaced with a star symbol (*) in the display of the graphical user interface, and be replaced with an audible beep during TTS (modules 3 and 7). The User Field Customization Module (item 12) will contain the specific lists of words to be filtered for each language mode.

Speech Recognition Lexicon Selection Based on User Repair and Boosting

To run on small devices it is frequently not possible to carry a large dictionary of words that provides a reasonable good coverage for a language. The proposed method circumvents this problem by building initial systems with considerably smaller dictionaries for efficiency. Coverage by contrast is then generally a problem as many common words may not be available in the systems dictionaries. To recover generality/robustness without paying the price of more memory requirements, a method is disclosed that can achieve a tighter more targeted dictionary and language model through personalization and customization of the system by the user. In this manner, the system design sacrifices only some generality of vocabularies of an overall user population, but retains the generality of vocabulary use by the individual owner and user of the device. Prior research shows, for example, that discussions between human conversant around a certain topic of interest will generally only have vocabulary sizes of about 4,000 words, while general speech translation systems may have vocabulary sizes of 40,000 words or more (in English). The system would therefore be delivered in a state where vocabulary is more severely curtailed than in larger more general systems and thus be more parsimonious in memory use than a larger system. With vocabularies of 4,000-10,000 words, search trees, language models and pronunciation dictionaries can be reduced dramatically over vocabulary sizes of 40,000 or more. In this case, however, we will generally observe a larger mismatch between the vocabulary of the system and the desired vocabulary of the user, and out-of-vocabulary words will appear in the spoken utterances. Now, the proposed system will come with a large background dictionary, and large pre-trained language models. This is possible without loss of advantage, since the large dictionaries and language models can be stored in flash memories that are typically available in abundance (e.g. to store music, pictures, etc.) on modern mobile phones. When an out-of-vocabulary item occurs the system now provides an easy method to correct the consequential misrecognition by various corrective mechanisms. Once the correction has been noted, the appropriate dictionaries and models (recognition, translation, synthesis) can be retrieved and added or replace less useful ones.

The speed of the speech translation system shown in FIG. 1 is dependent on the vocabulary size of the speech recognition models (item 17) applied. In an embodiment of the system recognition is performed with a medium sized recognition vocabularies consisting of around 40,000 entries. This vocabulary size provides reasonable coverage over possible words uttered by users and allows speech recognition (step 27) to be performed reasonably fast. In addition to this method, an additional embodiment could be realized using a much smaller initial recognition vocabulary (item 20) and language model (item 19) consisting of less than 10,000 vocabulary entries. When the user identifies a new word using the Correction and Repair Module (module 11) the appropriate speech recognition models (item 17) will be updated via the User Field Customization Module (module 12). This procedure is shown in FIG. 3, steps 35, 36 and 37. Once identified the new word is incorporated into the system as shown in FIG. 5.

Automatic Identification of the Input Language

In current speech translators a user has to select a record button that pertains to the language of the speaker/user. In speech translators for two-way dialogs, this means that at least two record buttons have to be provided for the two possible language inputs. This, unfortunately, wastes screen real estate and can lead to user errors when the wrong button is pushed. In the interest of simplification, we propose to eliminate this source of user confusion, but providing automatic language identification first and then produce translation in the other language, no matter which language was spoken.

The basic speech translation system shown in FIG. 1 operates over two languages, language $L_a$ and language $L_b$. For consecutive translation the user holds down a push-to-talk button (FIG. 3, step 15b) to start the speech recognition process (FIG. 3, step 27). The identity of the button pushed will determine if recognition is performed in language $L_a$ (using FIG. 1, module 2) the primary users language, or in language $L_b$ (using FIG. 1, module 9) the language of the dialog participant. In addition to this approach, an embodiment of the system will perform automatic identification of the input language (step 27a) to select the appropriate ASR module to use for recognition (step 27b). In another embodiment, language identification (step 27a) is used to select the appropriate ASR module where modules exist for more than two languages. In another embodiment, it is also applied during simultaneous translation.

Language Learning from Speech Translation

Speech translators today are aiming to provide two-way speech dialog communication for people who don't speak each other's languages. Frequently, though, a user may wish to learn another person's language themselves as well. To provide such possibilities, we expand the speech translator function by the function of providing language instruction to the human user. Such an expanded speech translator/language tutor/trainer differs from other language instruction/tutoring software products in two fundamental ways: 1.) the disclosed combined language system provides a speech translator for language support when the user's language abilities are inadequate to navigate a real situation in actual use, and 2.) the combined system can then provide much more customized, targeted language learning drills and instruction that is responding specifically to a user's language learning interest, situations, and it bases its instruction on what it can observe from a user's language usage during speech translation dialog use. Thus, a user may converse with other individuals through use of the speech translator over a period of time, and then gradually attempt to learn for him/herself the key concepts, vocabularies, language constructs that he/she often uses and wishes to learn for him/herself. Thus a language learning drill can be personalized and targeted much more concretely at the specific language needs of an individual user than static impersonal language learning books or software would and thus it presents a much more personal and alive human language learning experience. In the preferred embodiment, the language learning subsystem builds vocabulary, syntax or conversational drills that derive from the sentences found in the recent history of the speech translator.

In addition to the basic speech translation system shown in FIG. 1 an embodiment of this system will add additional functionality to allow users to learn language Lb as they use the system in the field. The language learning module (item 12a) observes sentences a user has uttered over a period of time (items 14e, 14f) and builds a profile of common language usage statistics. Statistics include typical syntactic constructs and vocabulary usage. When the user enters the language learning mode (step 15g), the system will consolidate statistics from recent system logs (step 118) and use this information to construct vocabulary drills based on word usage by the user and related words based on topic or usage as determined by word frequency or semantic word clustering (step 119). A similar approach will be used to generate syntax drills (step 120). The drills will be presented to the user (step 121), and if performance is not satisfactory (step 122) the user will perform the drill again. In parallel to the automatic construction of language learning drills, the user is also provided with direct control over his/her language learning drills. Each sentence spoken in the speech translator can also be directly copied to the learning module (step 34c), so that its words and expressions appear in the subsequent learning drills. When sentences are added to the active learning drill, the system first checks if the drill contains the sentence (step 118a) and if it does not before appends it (step 118b).

Speech Translation of Telephone Conversation

In the previous disclosures, we have considered speech translators for portable devices such as smart phones and PDA's. In all these deployments, the speech translator acts as an interpreter between two people in a face to face dialog situation where the device acts as the translator. We expand this notion, by using a speech translator on a telephone as an interpreter between people speaking over that telephone as a transmission channel with each other. To achieve this functionality, we modify the user interface. Speech is now arriving via the microphone of the user of the telephone as well as by the signal transmitted over the telephone line and is recognized and translated. The speech translation is performed in either consecutive translation mode (a speaker speaks, and then waits for translation, before the other speaker takes his turn) as well as simultaneous translation mode (when either speaker can speak continuously while the translator performs speech translation output in parallel).

The basic speech translation mode operates using speech input from microphones (items 1 and 10) and loudspeakers (items 5 and 6) located on the device. In addition to this mode, speech translation can also be performed over a telephony network. In this case audio for language Lb is transmitted over the telephone network and the microphone (item 10) and loudspeaker (item 5) for language Lb will be physically located on a recipient's telephony handset. When operated over a telephony network speech recognition (modules 2, 9) and machine translation (modules 3, 8) can be carried out in two different manners. In consecutive translation the user holds a push-to-talk button down (step 15b) to start recognizing an utterance (step 27). The utterance is then recognized and translated using the steps shown in FIG. 3. In simultaneous translation (steps 15d, 34a) no button push is required but the system continuously recognizes and translates all speech present on both microphone inputs (items 1 and 10). Speech translation output from (step 33) is then provided either acoustically, overlaying or in place of the original speaker's speech, or visually, by displaying text on a user's telephone device.

Information Extraction Based on Recognized and Translated Speech

Speech Recognizers and Translators operating on a smart phone can also provide information as to a user's speech content. We propose to expand the speech recognizer and translator to extract topical information from two conversants' speech. Such information is then used to seek relevant related information on the internet. Such information is then presented to the user. There are multiple uses of such conversation enabled information extraction. It could be used to provide more targeted advertising (perhaps in return for cheaper calling rates). It could also be used to provide the user with helpful supporting information (for example, calling up flight schedules, hotel availabilities & rates, recalling a person's contact details, etc.) when a conversation mentions certain topics, people, places, or activities. This information can also be recalled bilingually from sources in either of the languages handled by the speech translator.

The information extraction module (module 12a) extracts key words and phrases from system logs (items 14e and 14f) generated by the speech recognition (modules 3, 8) and machine translation (modules 3, 8) components. First, usage statistics from recent system logs (step 123) are generated. Next, relevant information is obtained from the internet or local knowledgebase (item 125) based on keyword occurrence and language usage (step 124). This information is subsequently presented to the user (step 126) via the screen of the device (FIG. 1, item 13). Presented information will include targeted advertising and supportive information. Supportive information includes flight schedules, hotel availability and rates, and contact details of persons. Information can be presented bilingually in either language ($L_a$ or $L_b$) by searching based on keywords in the output of machine translation (modules 3, 8).

While the foregoing has been set forth in considerable detail, it is to be understood that the drawings and detailed embodiments are presented for elucidation and not limitation. Design variations may be made but are within the principles of the invention. Those skilled in the art will realize that such changes or modifications of the invention or combinations of elements, variations, equivalents, or improvements therein are still within the scope of the invention as defined in the appended claims. Also, the examples and experimental results illustrated herein are exemplary and are not intended to limit the scope of the embodiments of the invention.

What is claimed is:

1. A method comprising:
receiving from a user an utterance in a first language including a first term;
by a speech translation system, translating the utterance from the first language into a second language;
receiving an indication from the user to initiate a user customization process for customizing one or more modules of the speech translation system to the user; and
under the user customization process:
receiving an indication from the user to add the first term to one or more modules of the speech translation system;
in response to the received indication from the user, determining word class information for the first term;
adding, by the speech translation system, the first term, the determined word class information, and at least a portion of the translation of the utterance in the second language to a first machine translation module associated with the first language of the speech translation system; and
adding the first term and the at least a portion of the translation of the utterance in the second language to a shared database for a community such that the customization performed by the user is available for use by other users of the community in translations by the speech translation system.

2. The method of claim 1, further comprising:
retrieving a second term from the shared database; and
adding the second term from the shared database to the first machine translation module.

3. The method of claim 1, wherein the at least a portion of the translation of the utterance in the second language added to the shared database comprises an incorrect or incomplete translation, and further comprising:
requesting, with the first term added to the shared database, a translation correction for the first term.

4. The method of claim 1, further comprising:
retrieving a corrected translation of the first term from the shared database; and
adding the corrected translation from the shared database to the first machine translation module.

5. The method of claim 4, wherein the corrected translation of the first term in the shared database is provided by a second user of the community.

6. The method of claim 5, wherein the shared database stores terms associated with one or more fields comprising one or more of: names, expressions, special terms.

7. The method of claim 1, further comprising:
displaying simultaneously in text, on a user interface display of the speech translation system, at least (i) the received utterance in the first language, and (ii) the translation of the utterance in the second language.

8. The method of claim 1, wherein translating the utterance in the first language into the second language comprises generating a translation in the second language via either a rule-based model or a statistical model.

9. The method of claim 1, further comprising:
in response to the received indication from the user, determining a pronunciation in the first language for the first term; and
adding the first term, the determined word class information, and the pronunciation in the first language to a first recognition lexicon of the first language of a first automatic speech recognition module of the speech translation system.

10. The method of claim 1, further comprising:
saving the utterance and the translation as sentence pairs upon instruction by the user to save the sentence pairs as a favorite in a speech translation favorites module configured to store a list or hierarchical inventory of such sentence pairs wherein each favorite can be customized and played directly upon user selection in either the first or second language.

11. The method of claim 1, further comprising:
in response to the received indication from the user, determining a pronunciation in the first language for the first term; and
adding the pronunciation in the first language to the shared database.

12. The method of claim 1, further comprising:
in response to the received indication from the user, determining a pronunciation in the second language for the first term; and
adding the pronunciation in the second language to the shared database.

13. A computer program product comprising a non-transitory computer-readable storage medium containing computer program code for performing the steps:
receiving from a user an utterance in a first language including a first term;
translating, by a speech translation system, the utterance in the first language into a second language;
receiving an indication from the user to initiate a user customization process for customizing one or more modules of the speech translation system to the user; and
under the user customization process:
receiving an indication from the user to add the first term to one or more modules of the speech translation system;
in response to the received indication from the user, determining word class information for the first term;
adding by the speech translation system the first term, the determined word class information, and at least a portion of the translation of the utterance in the second language to a first machine translation module associated with the first language of the speech translation system; and
adding the first term and the at least a portion of the translation of the utterance in the second language to a shared database for a community such that the customization performed by the user is available for use by other users of the community in translations by the speech translation system.

14. The computer program product of claim 13, further comprising computer program code for performing the steps:
retrieving a second term from the shared database; and
adding the second term from the shared database to the first machine translation module.

15. The computer program product of claim 13, wherein the translation in the second language added to the shared database comprises a poor translation, further comprising computer program code for performing the step:
requesting, with the first term added to the shared database, a translation correction for the first term.

16. The computer program product of claim 13, further comprising computer program code for performing the steps:
retrieving a corrected translation of the first term from the shared database; and
adding the corrected translation from the shared database to the first machine translation module as.

17. The computer program product of claim 13, wherein the corrected translation of the first term in the shared database is provided by a second user of the community.

18. The computer program product of claim 17, wherein the shared database stores terms associated with one or more fields comprising one or more of: names, expressions, special terms.

19. The computer program product of claim 13, further comprising computer program code for performing the step:
displaying simultaneously in text, on a user interface display of the speech translation system, at least (i) the received utterance in the first language, and (ii) the translation of the utterance in the second language.

20. The computer program product of claim 13, wherein translating the utterance in the first language into the second language comprises generating a translation in the second language via either a rule-based model or a statistical model.

21. The computer program product of claim 13, further comprising computer program code for performing the steps:
in response to the received indication from the user, determining a pronunciation in the first language for the first term; and
adding the first term, the determined word class information, and the pronunciation in the first language to a first recognition lexicon of the first language of a first automatic speech recognition module of the speech translation system.

22. A system comprising:
a computer processor; and
a memory, comprising:
an automatic speech recognition module for receiving from a user, an utterance in a first language including a first term associated with a field term;
a translation module for translating the utterance from the first language into a second language;
a user field customization module for receiving an indication from the user to initiate a user customization process for customizing one or more modules of the speech translation system to the user; and
under the user customization process:
for receiving an indication from the user to add the first term to one or more modules of the speech translation system,
for, in response to the received indication from the user, determining word class information the first term,
for adding by the speech translation system the first term, the determined word class information, and at least a portion of the translation of the utterance in the second language to a first machine translation module associated with the first language of the speech translation system; and
for adding the first term and the at least a portion of the translation of the utterance in the second language to a shared database for a community such that the customization performed by the user is available for use by other users of the community in translations by the speech translation system.

* * * * *

UNITED STATES PATENT AND TRADEMARK OFFICE
CERTIFICATE OF CORRECTION

PATENT NO. : 9,753,918 B2
APPLICATION NO. : 14/589540
DATED : September 5, 2017
INVENTOR(S) : Alexander Waibel et al.

It is certified that error appears in the above-identified patent and that said Letters Patent is hereby corrected as shown below:

On the Title Page

Under item (63):
Delete "a continuation of application No. 12/689,042" and replace with --a continuation in part of application No. 12/689,042--; and Delete "a continuation of application No. 12/424,311" and replace with --a continuation in part of application No. 12/424,311--.

In the Claims

Column 28, Line 7, after "the first machine translation module", delete "as".

Signed and Sealed this
Fourth Day of September, 2018

Andrei Iancu
*Director of the United States Patent and Trademark Office*